(12) United States Patent
Sasaki et al.

(10) Patent No.: US 10,696,153 B2
(45) Date of Patent: Jun. 30, 2020

(54) LID MOUNTING STRUCTURE AND METHOD OF MOUNTING LID

(71) Applicant: FTS CO., LTD., Toyota, Aichi Prefecture (JP)

(72) Inventors: Yasuyuki Sasaki, Aichi Prefecture (JP); Takashi Momiyama, Aichi Prefecture (JP); Shinji Shimokawa, Aichi Prefecture (JP); Masachika Aoki, Aichi Prefecture (JP); Osamu Tokura, Aichi Prefecture (JP)

(73) Assignee: FTS CO., LTD., Toyota, Aichi Prefecture (JP)

( * ) Notice: Subject to any disclaimer, the term of this patent is extended or adjusted under 35 U.S.C. 154(b) by 1 day.

(21) Appl. No.: 16/158,199

(22) Filed: Oct. 11, 2018

(65) Prior Publication Data

US 2019/0135106 A1 May 9, 2019

(30) Foreign Application Priority Data

Nov. 9, 2017 (JP) .................. 2017-216098
Nov. 10, 2017 (JP) .................. 2017-217024
Jan. 26, 2018 (JP) .................. 2018-011385
Jun. 14, 2018 (JP) .................. 2018-113284

(51) Int. Cl.
*B60K 15/05* (2006.01)

(52) U.S. Cl.
CPC ........ *B60K 15/05* (2013.01); *B60K 2015/053* (2013.01); *B60K 2015/0507* (2013.01); *B60K 2015/0553* (2013.01)

(58) Field of Classification Search
CPC ............. B60K 15/05; B60K 2015/053; B60K 2015/0553
USPC ...................................... 296/97.22
See application file for complete search history.

(56) References Cited

U.S. PATENT DOCUMENTS 5,165,749 A * 11/1992 Sheppard ............... B60K 15/05
220/86.2

FOREIGN PATENT DOCUMENTS

DE 102015212838 * 1/2017 ............ B60K 15/05
JP 2005-343367 A 12/2005
JP 2015-098284 A 5/2015

* cited by examiner

*Primary Examiner* — Dennis H Pedder
(74) *Attorney, Agent, or Firm* — McGinn I.P. Law Group, PLLC

(57) ABSTRACT

A box and a lid that form a fuel filler hole or a charging socket of a car body, the lid including a lid mounting part, and a box mounting arm including a box engaging pin. An open/close spring is attached to the box mounting arm. The box includes a box body, and an arm housing part extending from the box body and including an arm guide that guides the box mounting arm. The box engaging pin of the box mounting arm of the lid is guided into the arm guide of the box and attached to an arm engaging part of the box, while the open/close spring abuts on a connecting point (a spring mounting portion) between an inclined part and a step part of the arm housing part.

20 Claims, 13 Drawing Sheets

LID MOUNTING STRUCTURE AND METHOD OF MOUNTING LID

CROSS-REFERENCE TO RELATED APPLICATION

This application is related to and claims priority from Japanese patent application No. 2017-216098, Japanese patent application No. 2018-11385, Japanese patent application No. 2017-217024 and Japanese patent application No. 2018-113284 incorporated herein by reference.

BACKGROUND OF THE INVENTION

Field of the Invention

The present invention relates to a mounting structure and a method of mounting a lid that can be opened and closed and used for a fuel filler hole or a charging socket and the like of an automobile or the like.

DESCRIPTION OF THE RELATED ART INCLUDING INFORMATION

When filling a car fuel tank with fuel, for example, a fuel lid 110 that closes a fuel filler hole 101 provided to a car body is opened and the fuel is supplied from the fuel filler hole 101.

The fuel lid 110 has a lid mounting member 120 on the backside thereof as shown in FIGS. 1 and 2. The lid mounting member 120 is attached to a fuel filler box 140. The fuel lid 110 is attached to the fuel filler hole 101 together with the fuel filler box 140 (Patent Literature 1: JP 2005-343367 A).

An engaging pin 121 of the lid mounting member 120 to engage with the fuel filler box 140 is provided on the inner end of the fuel filler hole 101 laterally out of the fuel lid 110 so as to secure space for opening and closing the fuel lid 110. Therefore, the lid mounting member 120 is curved largely and extended as far as to laterally out of the fuel lid 110.

To open the fuel lid 110, lock is released by opening a lock pin (not shown) of the fuel lid 110, and the distal end of the fuel lid 110 is slightly lifted up with a resilient member 141 attached to the fuel filler box 140. After that, the distal end of the fuel lid 110 is lifted up by hand to open the fuel lid 110 widely.

To keep the fuel lid 110 at the open position, a spring member is used for holding the fuel lid 110. Therefore, two components are necessary, namely, one for lifting up the distal end of the fuel lid 110 slightly, and the other for holding the fuel lid 110 at the open position, which is the cause of increased assembling effort and costs.

One known lid mounting structure thus uses a spring member 240 shown in FIG. 3 (Patent Literature 1: JP 2005-343367 A). In this structure, a body-side fixing part 241 of the spring member 240 is fixed to a box part, while a lid member-side fixing part 242 is attached to an arm of a lid member, so that a biasing force acts in the direction of extension and contraction of the spring member 240 as well as in a direction perpendicular thereto. Thus, a biasing force for slightly lifting up the distal end of the fuel lid 110 and a biasing force for keeping the fuel lid 110 at the open position are both applied.

In this case, however, to lift up the distal end of the fuel lid 110 slightly, the arm of the lid member is pressed by a spring member body 243 that is a central part of the spring member 240. Therefore, when the arm of the lid member has a different size or shape, the entire shape of the spring member 240 and the sizes of the spring member and the arm of the lid member both have to be adjusted. The spring member 240 is thus poor in general versatility.

Meanwhile, as shown in FIG. 2, the fuel filler box 140 laterally extends more than the opening of the fuel filler hole 101, whereby a large space is necessary to secure enough space for installing the fuel filler box 140, and the work efficiency of assembling the fuel filler box 140 to the fuel filler hole 101 is poor.

Since the opening shape of the fuel filler hole 101 is changed for each type of vehicle, the shape of the lid mounting member 120 also had to be changed for each vehicle, whereby shared use of components is difficult.

When attaching the engaging pin 121 of the lid mounting member 120 to the fuel filler box 140, it is necessary to slide the distal end of the lid mounting member 120 into the inner end of the fuel filler box 140, whereby the work efficiency of assembling the lid mounting member 120 to the fuel filler box 140 is poor.

When the fuel lid 110 is opened at a large angle, a central portion of the lid mounting member 120 may sometimes abut on an edge of the fuel filler box 140 and cause a biasing force to act on the distal end of the lid mounting member 120 to rotate. If this happens, the distal end of the lid mounting member 120 may separate from the engaging pin 121 and come off of the fuel filler box 140.

Another lid mounting structure is described in Patent Literature 2 (JP 2015-98284 A). As shown in FIG. 4, a saucer 200 has a tubular part 202 extending in and out of the car, and a horizontal extension 203 extending horizontally from the tubular part 202. One end of the tubular part 202 outside the car forms an opening 201. The horizontal extension 203 is formed in a box-like shape extending horizontally from a side portion of the tubular part 202. A lid member 300 includes a lid body 301 that can close the opening 201 in a recess of the saucer 200, and an arm 302 connecting the lid body 301 and the saucer 200. The lid body 301 is formed in a generally plate-like shape. The arm 302 extends from the backside of the lid member 300 into the horizontal extension 203 of the saucer 200. In the present embodiment, the arm 302 is curved to protrude inward in the car width direction, and rotatably fixed by a pin 400 extending in the up and down direction on the outer side in the width direction of the horizontal extension 203 of the saucer 200. A spring 500 that extends and contracts in predetermined directions is interposed between the saucer 200 and the lid member 300.

As shown in FIG. 4, the spring 500 is set inside the horizontal extension 203 of the saucer 200 between the horizontal extension 203 and the arm 302 in a horizontally compressed state. As shown in FIG. 5, the spring 500 is set in position, with its body-side fixing part 501 fixed to the horizontal extension 203 while its lid member-side fixing part 502 fixed to the arm 302.

When the lid member-side fixing part 502 of the spring 500 is positioned on the closing side in the rotating direction of the lid member 300 from an imaginary line 600 that connects a rotation center (pin 400) of the lid member 300 and the body-side fixing part 501 of the spring 500, the biasing force of the spring 500 acts in the direction in which it causes the lid member 300 to close. On the other hand, when the lid member-side fixing part 502 is positioned on the opening side in the rotating direction of the lid member 300 from the imaginary line 600, the biasing force of the spring 500 acts in the direction in which it causes the lid member 300 to open.

Although how the lid shown in FIGS. 4 and 5 is mounted is not described in the detailed description of the invention in Patent Literature 2 (JP 2015-98284 A), it is assumed to be as follows, based on the drawings. First, the lid member-side fixing part 502 of the spring 500 is attached to the arm 302 of the lid member 300. Next, with the lid member 300 opened, the arm 302 is inserted from the opening 201 of the saucer 200 into the horizontal extension 203, and a hole drilled in a side face of the horizontal extension 203 is aligned with an insertion hole of the pin 400 in the arm 302.

Next, the pin 400 is inserted into the hole drilled in the side face of the horizontal extension 203 and the insertion hole of the pin 400 in the arm 302, to fix the arm 302 to the horizontal extension 203. In this state, the body-side fixing part 501 of the spring 500 is in a free state. Next, the body-side fixing part 501 of the spring 500 is searched by hand inside the horizontal extension 203, and lastly, the spring 500 is compressed in the contracting direction and placed into the predetermined position in the horizontal extension 203 of the saucer 200.

According to the method of mounting the lid of Patent Literature 2 (JP 2015-98284 A), holes drilled in both side faces of the horizontal extension 203 need to be aligned with the insertion hole for the pin 400 of the arm 302, and the pin 400 need to be inserted while the holes are kept aligned, and thus the work efficiency remains to be an issue. After fixing the arm 302 to the horizontal extension 203, 1) the body-side fixing part 501 of the spring 500 that is in a free state must be searched by hand inside the horizontal extension 203 that is out of sight, and 2) after finding the body-side fixing part 501 of the spring 500, the body-side fixing part 501 of the spring 500 must be placed into the predetermined position in the horizontal extension 203 of the saucer 200 while the spring is kept compressed in the contracting direction, and thus the work efficiency remains to be an issue. Another issue is that it is impossible to check if the body-side fixing part 501 of the spring 500 has in fact reached the predetermined position in the horizontal extension 203 of the saucer 200 shown in FIG. 5.

SUMMARY OF THE INVENTION

Accordingly, an object of the present invention is to provide a lid mounting structure that is easily adjustable for different shapes of lids that close a fuel filler hole or a charging socket of a car body or of mounting arm members.

Another object of the present invention is to provide a lid mounting structure that allow easy attachment of a lid to a box such that the lid is hardly separable and a method of mounting the lid.

The present invention as set forth in claim 1 resides in a lid mounting structure for opening and closing a lid that closes a fuel filler hole or a charging socket of a car body, the lid mounting structure including: a mounting arm member attached to the lid; and a box attached to the fuel filler hole or the charging socket, the box to which the mounting arm member is attached; the mounting arm member including a lid mounting part to which the lid is attached, and a box mounting arm rotatably attached to the box, the box mounting arm including a box mounting arm engagement part at a distal end thereof that rotatably engages the mounting arm member with the box; and the box including an arm housing part extending from a box body, the arm housing part including an engaging pin mounting part to which a box engaging pin that engages with the box mounting arm engagement part of the mounting arm member is attached; and the lid mounting structure further including: an open/close spring attached to the box and the mounting arm member biasing the mounting arm member; the open/close spring including: an open/close spring box-mounted part held by the arm housing part of the box; an open/close spring arm-mounted part held by the box mounting arm engagement part of the mounting arm member; an open/close spring body connecting the open/close spring arm-mounted part and the open/close spring box-mounted part; and an open/close spring box-abutment part extending from a distal end of the open/close spring arm-mounted part to abut on the arm housing part.

According to the present invention as set forth in claim 1, in a lid mounting structure for opening and closing a lid that closes a fuel filler hole or a charging socket of a car body, a mounting arm member is attached to the lid, a box is attached to the fuel filler hole or the charging socket, and the mounting arm member is attached to the box. Thus, the lid is attached to the box by the mounting arm member such as to be opened and closed, so that the lid can open and close the fuel filler hole or charging socket of the car body.

The mounting arm member includes a lid mounting part to which the lid is attached, and a box mounting arm rotatably attached to the box. The box mounting arm includes a box mounting arm engagement part at a distal end thereof that rotatably engages the mounting arm member with the box. Thus, the mounting arm member rotates around the box mounting arm engagement part attached to the box, so that the lid can open and close the fuel filler hole or charging socket of the car body.

The box includes an arm housing part extending from a box body, and the arm housing part includes an engaging pin mounting part to which a box engaging pin that engages with the box mounting arm engagement part of the mounting arm member is attached. Thus, the mounting arm member rotates around the box engaging pin attached to the box, so that the lid can open and close the fuel filler hole or charging socket of the car body.

An open/close spring is attached to the box for biasing the box and the mounting arm member. The open/close spring includes an open/close spring box-mounted part held by the arm housing part of the box, an open/close spring arm-mounted part held by the box mounting arm engagement part of the mounting arm member, and an open/close spring body connecting the open/close spring arm-mounted part and the open/close spring box-mounted part. Therefore, the open/close spring biases the mounting arm member by resilient deformation, to stop the lid from closing during the fuel filling or charging.

An open/close spring box-abutment part extends from a distal end of the open/close spring arm-mounted part to abut on the arm housing part. Therefore, the open/close spring box-abutment part abuts on the arm housing part when the lid is closed, to be able to bias the distal end of the open/close spring arm-mounted part.

The present invention as set forth in claim 2 resides in a lid mounting structure wherein the open/close spring box-abutment part of the open/close spring biases the mounting arm member such as to slightly open the lid in opening the lid.

According to the present invention as set forth in claim 2, the open/close spring box-abutment part of the open/close spring biases the mounting arm member such as to slightly open the lid in opening the lid. Therefore, when the lock of the lid is released, the open/close spring box-abutment part biases the mounting arm member to slightly open the distal end of the lid, so that the lid can be readily opened by hand widely after that.

The present invention as set forth in claim 3 resides in a lid mounting structure wherein the open/close spring is formed of a single metal wire member, the open/close spring box-abutment part is formed by bending the metal wire member from the open/close spring arm-mounted part, and a distal end portion of the open/close spring box-abutment part abuts on the arm housing part when the lid is closed.

In the lid mounting structure according to the present invention as set forth in claim 3, the open/close spring is formed of a single metal wire member, the open/close spring box-abutment part is formed by bending the metal wire member from the open/close spring arm-mounted part, and a distal end portion of the open/close spring box-abutment part abuts on the arm housing part when the lid is closed. Therefore, the structure is simple since the spring is formed of a single metal wire, and it can be easily produced at low cost. The open/close spring can be easily adjusted and mounted even when there are changes in the shapes of the mounting arm member or box, simply by adjusting the angle or size of the open/close spring box-abutment part in accordance with the changes in the shapes.

The present invention as set forth in claim 4 resides in a lid mounting structure wherein the open/close spring box-abutment part applies a biasing force diagonally relative to a direction in which the open/close spring arm-mounted part biases the box mounting arm engagement part of the mounting arm member.

According to the present invention as set forth in claim 4, the open/close spring box-abutment part applies a biasing force diagonally relative to a direction in which the open/close spring arm-mounted part biases the box mounting arm engagement part of the mounting arm member. Therefore, the open/close spring box-abutment part can bias the box mounting arm engagement part separately from the force applied by the open/close spring arm-mounted part to bias the box mounting arm engagement part of the mounting arm member.

The present invention as set forth in claim 5 resides in a lid mounting structure wherein the open/close spring is formed by bending such as to have a substantially Z shape or square zigzag shape as a whole.

According to the present invention as set forth in claim 5, the open/close spring is formed by bending such as to have a substantially Z shape or square zigzag shape as a whole, so that the open/close spring can be formed from a single wire member by bending. Even though the open/close spring arm-mounted part and the open/close spring box-mounted part are respectively attached to the mounting arm member and the box, the connecting portions with the open/close spring body can flex, so that the open/close spring can bias the mounting arm member.

The present invention as set forth in claim 6 resides in a lid mounting structure further including a spring pressing projection that presses a portion near a connecting point between the open/close spring body and a distal end of the open/close spring arm-mounted part opposite from the distal end where the open/close spring box-abutment part extends, and that is provided on either the open/close spring arm-mounted part or the box.

According to the present invention as set forth in claim 6, a spring pressing projection that presses a portion near a connecting point between the open/close spring body and a distal end of the open/close spring arm-mounted part opposite from the distal end where the open/close spring box-abutment part extends, is provided on either the open/close spring arm-mounted part or the box. Therefore, when the open/close spring box-abutment part abuts on the box and biases the mounting arm member, the spring pressing projection can prevent the open/close spring from rotating by reaction force.

The present invention as set forth in claim 7 resides in a lid mounting structure wherein the mounting arm member further includes: a spring mounting portion holding the open/close spring arm-mounted part of the open/close spring; and a plurality of spring pressing protruded portions provided on both sides of the spring mounting portion, wherein the open/close spring arm-mounted part is sandwiched alternately by the spring mounting portion and the spring pressing protruded portions of the mounting arm member.

According to the present invention as set forth in claim 7, the mounting arm member further includes: a spring mounting portion holding the open/close spring arm-mounted part of the open/close spring; and a plurality of spring pressing protruded portions provided on both sides of the spring mounting portion, wherein the open/close spring arm-mounted part is sandwiched alternately by the spring mounting portion and the spring pressing protruded portions of the mounting arm member. Therefore, the open/close spring arm-mounted part of the open/close spring can be prevented from being displaced in the direction toward the open/close spring body and the opposite direction, by the spring mounting portions and spring pressing protruded portions of the mounting arm member, so that the open/close spring can be stably held on the mounting arm member.

The present invention as set forth in claim 8 resides in a lid mounting structure wherein the spring mounting portion of the mounting arm member sandwiches the open/close spring arm-mounted part such as to cover the open/close spring arm-mounted part.

According to the present invention as set forth in claim 8, the spring mounting portion of the mounting arm member sandwiches the open/close spring arm-mounted part such as to cover the open/close spring arm-mounted part, so that the open/close spring arm-mounted part can be securely and stably held on the mounting arm member in both lateral and up and down directions.

The present invention as set forth in claim 9 resides in a lid mounting structure for opening and closing a lid that closes a fuel filler hole or a charging socket of a car body, the lid mounting structure including: a mounting arm member attached to the lid; and a box attached to the fuel filler hole or the charging socket, the box to which the mounting arm member being is attached; the mounting arm member including a lid mounting part to which the lid is attached, and a box mounting arm rotatably attached to the box, the box mounting arm including a box engaging pin that is provided at a distal end thereof and rotatably engages the mounting arm member with the box; and the box including an arm housing part extending from a box body, the arm housing part including an arm engaging part that engages with the box engaging pin, and the box including an arm guide that guides the box engaging pin from the box body to the arm engaging part of the box.

According to the present invention as set forth in claim 9, in a lid mounting structure for opening and closing a lid that closes a fuel filler hole or a charging socket of a car body, a mounting arm member is attached to the lid, a box is attached to the fuel filler hole or the charging socket, and the mounting arm member is attached to the box. Thus, the lid is attached to the box by the mounting arm member such as to be opened and closed, so that the lid can close the fuel filler hole or charging socket of the car body.

The mounting arm member includes a lid mounting part to which the lid is attached, and a box mounting arm rotatably attached to the box. The box mounting arm includes a box engaging pin that is provided at a distal end thereof and rotatably engages the mounting arm member with the box. Thus, the mounting arm member rotates around the box engaging pin provided to the box, so that the lid can open and close the fuel filler hole or charging socket of the car body.

The box includes an arm housing part extending from a box body, the arm housing part includes an arm engaging part that engages with the box engaging pin, and the box includes an arm guide that guides the box engaging pin from the box body to the arm engaging part. Therefore, when attaching the mounting arm member to the box, by inserting the box engaging pin and moving it along the arm guide, the mounting arm member can be easily assembled to the box, even though the arm engaging part of the box is formed at the inner end of the box inside the car body and not directly visible. The arm guide may be formed as any of a groove, a notch, or a protrusion.

The present invention as set forth in claim 10 resides in a lid mounting structure further including a box engaging pin holding protrusion at a coupling point between the arm guide and the arm engaging part.

According to the present invention as set forth in claim 10, a box engaging pin holding protrusion is formed at a coupling point between the arm guide and the arm engaging part, so that the box engaging pin set at the arm engaging part can be prevented from coming off.

The present invention as set forth in claim 11 resides in a lid mounting structure wherein, when the lid is opened and the box mounting arm of the mounting arm member abuts on the box body of the box, the box engaging pin is biased in a rotating direction by rotation of the box mounting arm around an abutment point, and the arm guide near the box engaging pin holding protrusion is oriented along a direction that is different from the rotating direction in which the box engaging pin is biased.

According to the present invention as set forth in claim 11, when the lid is opened and the box mounting arm of the mounting arm member abuts on the box body of the box, the box engaging pin is biased in a rotating direction by rotation of the box mounting arm around an abutment point. The arm guide near the box engaging pin holding protrusion is oriented along a direction that is different from the rotating direction in which the box engaging pin is biased.

Therefore, when the lid is opened widely, the box mounting arm of the mounting arm member may sometimes abut on the box body of the box. However, the box mounting arm is biased in the rotating direction to rotate around the abutment point, which causes the box engaging pin to rotate, but not biased toward the box engaging pin holding protrusion and arm guide. The box engaging pin thus hardly comes off of the arm engaging part, since the arm guide is formed along a direction different from the biasing direction.

The present invention as set forth in claim 12 resides in a lid mounting structure further including two box engaging pin holding protrusions formed opposite each other on the arm guide, wherein the two box engaging pin holding protrusions are spaced apart from each other by a distance that is 90 to 99% of a diameter of the box engaging pin, or by a distance that is 90 to 99% of an axial length of the box engaging pin.

According to the present invention as set forth in claim 12, two box engaging pin holding protrusions are formed opposite each other on the arm guide, and the two box engaging pin holding protrusions are spaced apart from each other by a distance that is 90 to 99% of a diameter of the box engaging pin, or by a distance that is 90 to 99% of an axial length of the box engaging pin. The distance between the box engaging pin holding protrusions is thus set such that the box engaging pin holding protrusions can flex when the box engaging pin is inserted therebetween to allow the pin to fit, but not to allow the pin to come off easily. Therefore, the box engaging pin can be easily attached to the arm engaging part and yet it is hardly separable.

When the distance between the box engaging pin holding protrusions is less than 90% of the diameter of the box engaging pin or the axial length of the box engaging pin, the distance is too narrow for the box engaging pin to pass through and make the attachment of the box engaging pin hard. When the distance exceeds 99% of the diameter of the box engaging pin or the axial length of the box engaging pin, the distance is too wide and cause the box engaging pin to readily come off.

The present invention as set forth in claim 13 resides in a lid mounting structure wherein the box engaging pin includes an inclined surface cut toward a distal end thereof.

According to the present invention as set forth in claim 13, the box engaging pin includes an inclined surface cut toward a distal end thereof. This helps the box engaging pin holding protrusions flex easily and facilitates insertion of the box engaging pin between the box engaging pin holding protrusions, so that the assembling of the mounting arm member is made easy.

The present invention as set forth in claim 14 resides in a lid mounting structure wherein the box engaging pin has a circular, elliptic, or oval sectional shape.

According to the present invention as set forth in claim 14, the box engaging pin has a circular, elliptic, or oval sectional shape. Therefore, the box engaging pin can easily be inserted between the box engaging pin holding protrusions, so that the assembling of the mounting arm member is made easy.

The present invention as set forth in claim 15 resides in a lid mounting structure further including a box engaging pin holding protrusion having a substantially triangular sectional shape, with a slope on one side facing the arm guide being gentler than a slope on another side facing the arm engaging part.

According to the present invention as set forth in claim 15, a box engaging pin holding protrusion has a substantially triangular sectional shape, with a slope on one side facing the arm guide being gentler than a slope on another side facing the arm engaging part. Therefore, when the box engaging pin is inserted into between the box engaging pin holding protrusions, the gentle slope helps facilitate insertion, while the slope with the larger angle makes it hard for the box engaging pin to come off.

The present invention as set forth in claim 16 resides in a lid mounting structure wherein the lid mounting part of the mounting arm member is integrally formed on a backside of the lid.

According to the present invention as set forth in claim 16, since the lid includes the lid mounting part of the mounting arm member integrally formed on its backside, the connecting structure of the lid and the mounting arm member becomes simpler, and, with a fewer number of components, can be made more lightweight.

The present invention as set forth in claim 17 resides in a method of mounting a lid wherein a mounting arm member is attached to the lid that closes a fuel filler hole or a charging socket of a car body, a box including a recess and attached to the fuel filler hole or the charging socket includes a box body including an opening and an arm housing part extending from the box body, the mounting arm member includes: a lid mounting part to which the lid is attached; a box mounting arm rotatably attached to the arm housing part of the box; a box engaging pin that is provided at a distal end of the box mounting arm and rotatably engages the mounting arm member with the arm housing part of the box; and an open/close spring mounting portion to which an open/close spring that biases the mounting arm member is attached, the arm housing part of the box includes, along a longitudinal direction thereof: an inclined part that allows expansion of a space in the arm housing part toward inside a car; a step part connecting to the inclined part; and a bottom part that connects the step part and the box body, the arm housing part of the box includes, along a width direction thereof, an arm guide that guides the box engaging pin of the mounting arm member, and an arm engaging part at a distal end of the arm guide to which the box engaging pin is attached, the open/close spring includes an open/close spring arm-mounted part attached to the open/close spring mounting portion, an open/close spring box-mounted part that abuts on the arm housing part of the box, and an open/close spring body present between the open/close spring arm-mounted part and the open/close spring box-mounted part, the method including the steps of: fixedly setting the box substantially vertically to a jig, with the arm housing part facing downward; attaching the open/close spring arm-mounted part of the open/close spring to the open/close spring mounting portion of the mounting arm member; inserting the box engaging pin of the mounting arm member, to which the open/close spring has been attached, into the arm guide of the arm housing part of the box; moving the box engaging pin toward the arm engaging part at the distal end of the arm guide; and fixing the box engaging pin of the mounting arm member to the arm engaging part of the arm guide of the box, wherein the step of moving the box engaging pin of the mounting arm member, to which the open/close spring has been attached, toward the arm engaging part at the distal end of the arm guide includes the steps of: abutting the open/close spring box-mounted part of the open/close spring on the inclined part of the arm housing part of the box; moving the open/close spring box-mounted part along the inclined part toward the step part; abutting the open/close spring box-mounted part on a connecting point between the inclined part and the step part of the arm housing part and stays there; and flexing the open/close spring such that the open/close spring arm-mounted part and the open/close spring box-mounted part are compressed until the box engaging pin of the mounting arm member is fixed to the arm engaging part of the arm guide of the box.

According to the present invention as set forth in claim 17, the arm housing part of the box includes, along a width direction thereof, an arm guide that guides the box engaging pin of the mounting arm member, so that the box engaging pin of the mounting arm member can be inserted to the arm guide of the arm housing part and moved along the arm guide. Thus, when attaching the mounting arm member to the box, the mounting arm member can be easily assembled even though the arm engaging part is formed inside the arm housing part and not directly visible.

The box is fixedly set vertically to a jig, with the arm housing part facing downward. Therefore, the open/close spring box-mounted part of the open/close spring is facing substantially directly downward when, after attaching the open/close spring arm-mounted part of the open/close spring to the open/close spring mounting portion of the mounting arm member, the box engaging pin of the mounting arm member with the open/close spring attached thereto is inserted into the arm guide of the arm housing part of the box, and then moved toward the arm engaging part at the distal end of the arm guide. Therefore, when the open/close spring box-mounted part of the open/close spring abuts on the inclined part of the arm housing part of the box, a force acts in a direction in which the open/close spring box-mounted part moves on the inclined part toward the step part.

Further, since there is the step part that connects to the inclined part in the arm housing part, when the open/close spring box-mounted part, after moving on the inclined part toward the step part, abuts on the connecting point between the inclined part and the step part, it stays there. Thus, the open/close spring box-mounted part can reliably be fixed at a desired position.

Until the box engaging pin of the mounting arm member is fixed to the arm engaging part of the arm guide of the box, the open/close spring is flexed such that the open/close spring arm-mounted part and open/close spring box-mounted part are compressed. Therefore, when the box engaging pin of the mounting arm member is fixed at the arm engaging part of the arm guide of the box, the spring biases the mounting arm member, so that the lid is prevented from closing during the fuel filling or charging.

As discussed above, according to the present invention as set forth in claim 17, in the process in which the box engaging pin moves toward the arm engaging part of the arm housing part, the open/close spring box-mounted part of the open/close spring moves on the inclined part toward the step part by itself, abuts on the connecting point between the inclined part and the step part, and stays there, and thus can be fixed at a desired position. This way, with the box engaging pin inserted and moved along the arm guide of the box, the lid can easily and reliably be attached to the arm housing part even though its inside is out of sight.

The present invention as set forth in claim 18 resides in the method wherein the inclined part along the longitudinal direction of the arm housing part has an angle $\alpha$ ranging from 5° to 45° relative to a vertical line drawn from an extension line connecting upper ends on an arm housing part side and on a counter-arm housing part side of the box body outside the car to the connecting point between the inclined part and the step part.

According to the present invention as set forth in claim 18, the inclined part along the longitudinal direction of the arm housing part has an angle $\alpha$ ranging from 5° to 45° relative to a vertical line drawn from an extension line connecting upper ends on the arm housing part side and on the counter-arm housing part side of the box body outside the car to the connecting point between the inclined part and the step part. Therefore, when the open/close spring box-mounted part of the open/close spring abuts on the inclined part of the arm housing part of the box, a force acts in a direction in which the open/close spring box-mounted part moves on the inclined part toward the step part, so that the open/close spring box-mounted part of the open/close spring can be guided toward the connecting point between the inclined part and the step part of the arm housing part.

When a is smaller than 5°, there is less certainty that a force would act on the open/close spring box-mounted part of the open/close spring in the direction in which the open/close spring box-mounted part moves on the inclined part toward the step part when it has abutted on the inclined part of the arm housing part of the box. If a is larger than 45°, the force acts on the open/close spring box-mounted part in the direction in which the open/close spring box-mounted part moves on the inclined part toward the step part. On the other hand, the arm housing part of the box becomes unnecessarily larger. Likewise, a larger open/close spring becomes necessary, which is not preferable.

The present invention as set forth in claim 19 resides in the method wherein the inclined part and the step part make an angle β that satisfies 90°≤α+β≤130°. According to the present invention as set forth in claim 19, the inclined part and the step part make an angle β that satisfies 90°≤α+β≤130°. Therefore, space is secured for the open/close spring to move within the arm housing part when the mounting arm member rotates as the lid is opened or closed. Also, the open/close spring box-mounted part can be fixed at a desired position, since the open/close spring box-mounted part, after moving on the inclined part toward the step part, stays at the connecting point between the inclined part and the step part when it abuts thereon. An angle α+β exceeding 130° is not preferable because the open/close spring box-mounted part of the open/close spring moves past the connecting point between the inclined part and the step part of the arm housing part, and in the worst case, the open/close spring box-mounted part rides over the step part, in which case the open/close spring box-mounted part of the open/close spring cannot be fixed within the arm housing part of the box.

The present invention as set forth in claim 20 resides in the method wherein a box engaging pin holding protrusion is formed at a coupling point between the arm guide and the arm engaging part of the arm housing part, and the box engaging pin of the mounting arm member moves past the box engaging pin holding protrusion before being fixed to the arm engaging part of the arm guide.

According to the present invention as set forth in claim 20, a box engaging pin holding protrusion is formed at a coupling point between the arm guide and the arm engaging part of the arm housing part, and the box engaging pin of the mounting arm member moves past the box engaging pin holding protrusion before being fixed to the arm engaging part of the arm guide. Thus, the box engaging pin set at the arm engaging part can be prevented from coming off.

DETAIL DESCRIPTION OF THE PREFERRED EMBODIMENTS

Figure 1:
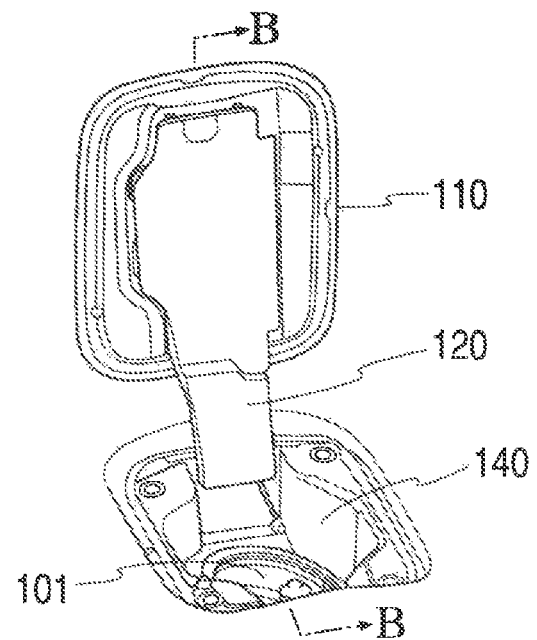
FIG. 1 is a perspective view of a conventional fuel filler hole part with a fuel lid open as seen diagonally from above.
Figure 2:
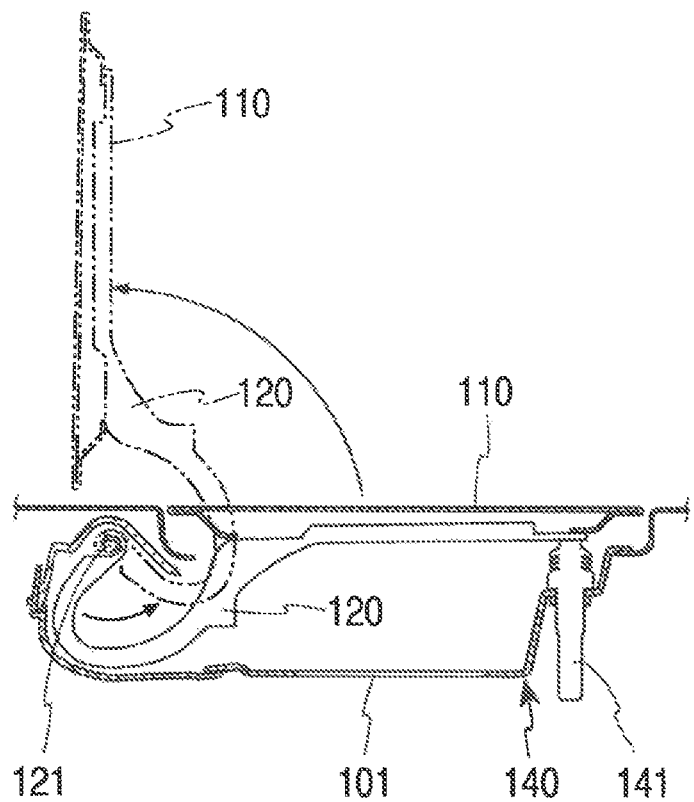
FIG. 2 is a sectional view along line B-B in FIG. 1 of the conventional fuel filler hole part with the fuel lid open.
Figure 3:
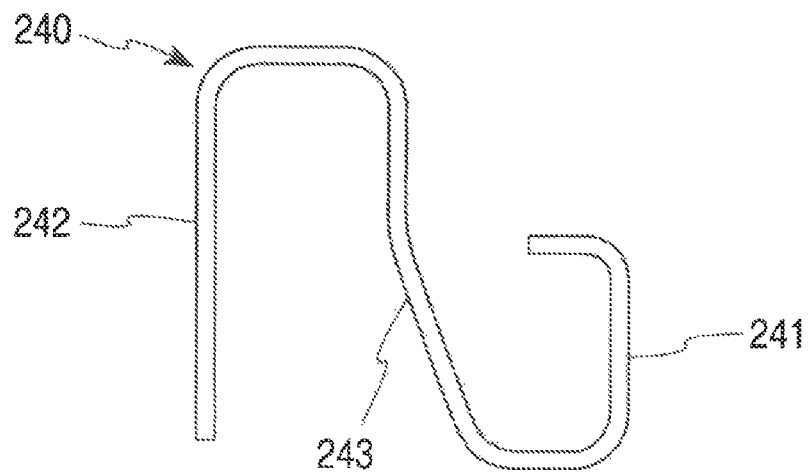
FIG. 3 is a plan view of another conventional open/close spring.
Figure 4:
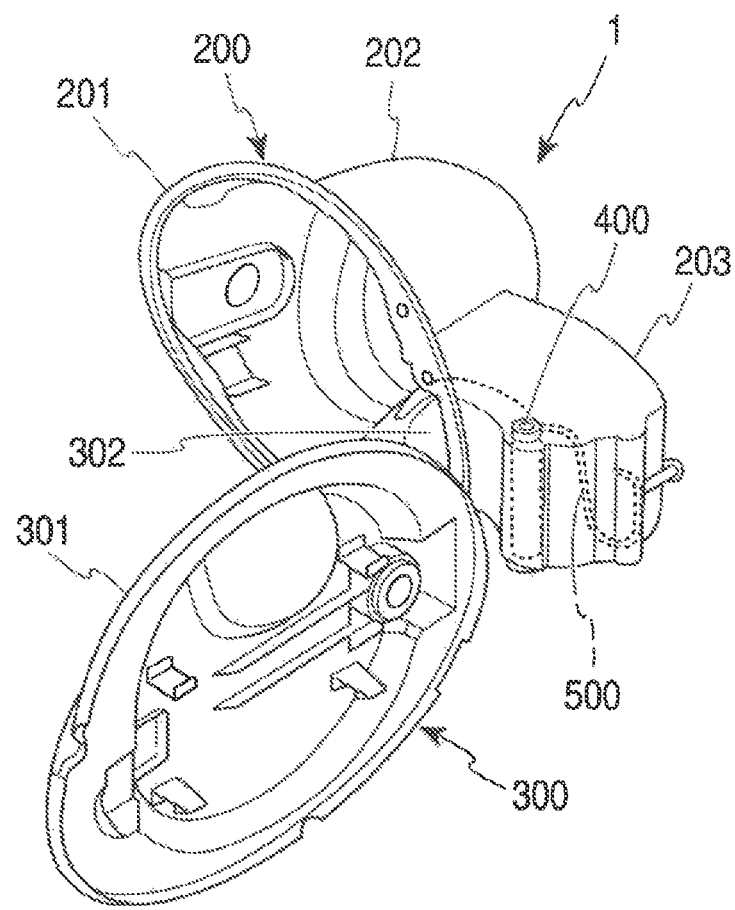
FIG. 4 is a perspective view of a conventional lid device.
Figure 5:
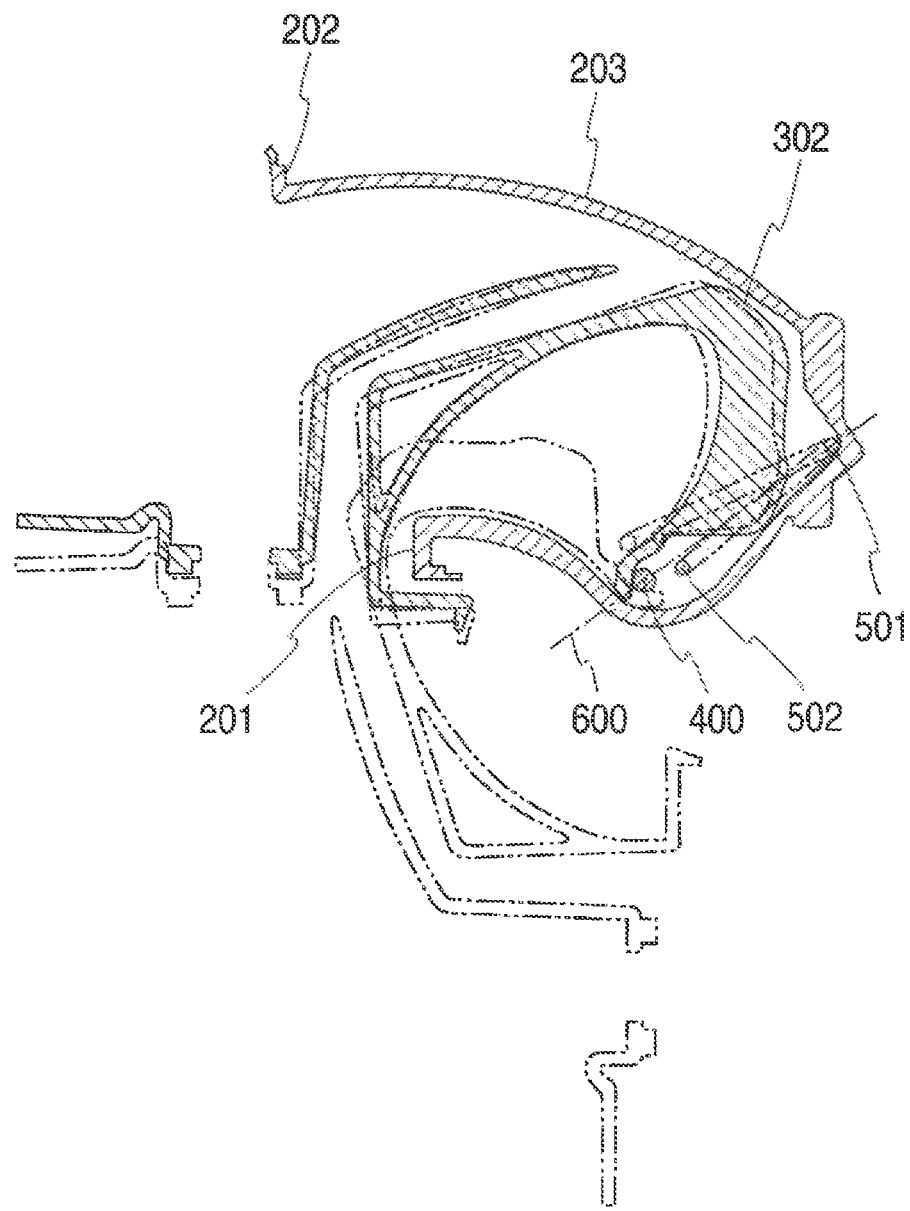
FIG. 5 is an enlarged sectional view of the conventional lid device.
Figure 6:
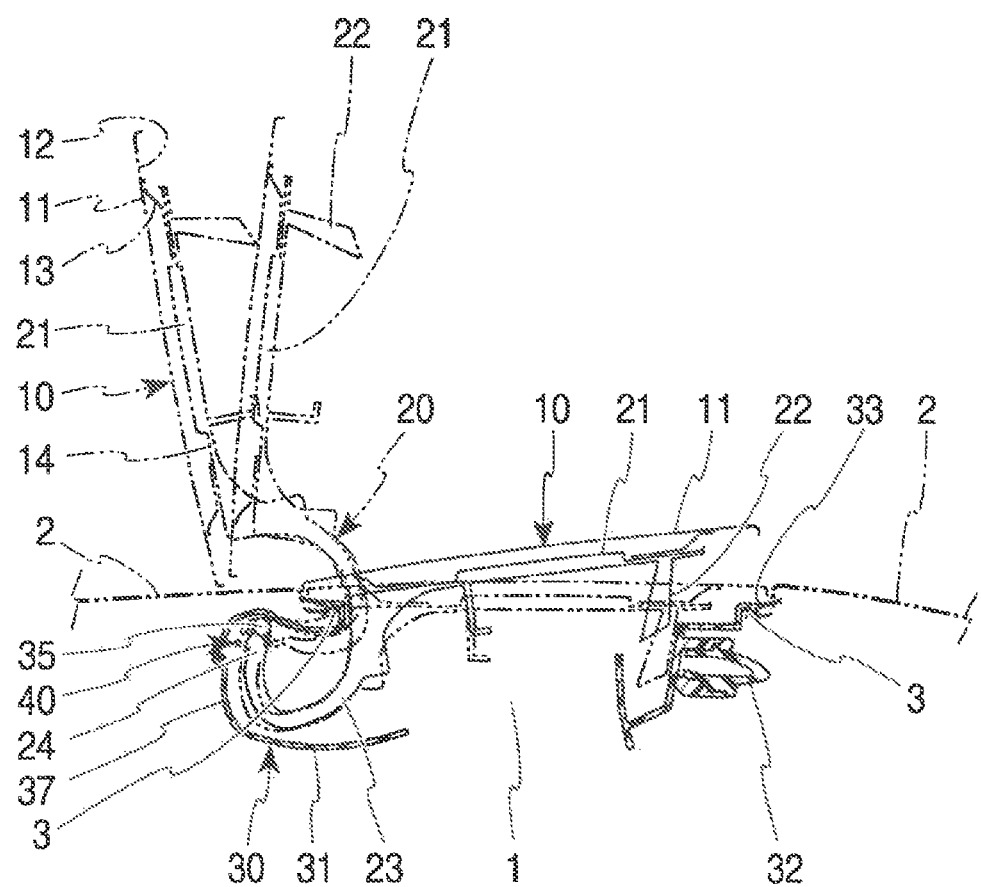
FIG. 6 is a sectional view of a box with a lid open, the lid, and a mounting arm member, showing an embodiment of the present invention.

While the present embodiment is used for a fuel filler hole for replenishing fuel, it can also be used for a charging socket of an electric car as well. A lid 10 of a fuel filler hole is shaped in conformity to the fuel filler hole 1 for closing the fuel filler hole 1 of a car body 2, as shown in FIG. 6. While the lid is formed in a quadrilateral shape in the embodiment of the present invention, it may be formed in a circular or elliptic shape in conformity to the shape of the fuel filler hole 1. A front side 11 of the lid 10 is painted in the same color as that of the car body 2 and has a flat smooth surface.

When filling the car fuel tank with fuel, the lid 10 that closes the fuel filler hole 1 provided to the car body 2 is opened and the fuel is supplied from the fuel filler hole 1.

On a backside 12 of the lid 10, an arm member mounting part 13 of the lid 10 for mounting a mounting arm member 20, which is a mounting member of the lid 10, is provided.

In the present embodiment, the arm member mounting part 13 of the lid 10 is formed as two parallel plates. The arm member mounting part 13 of the lid 10 is provided with an arm member mounting hole 14 of the lid 10, to which the mounting arm member 20 is attached.

Figure 7:
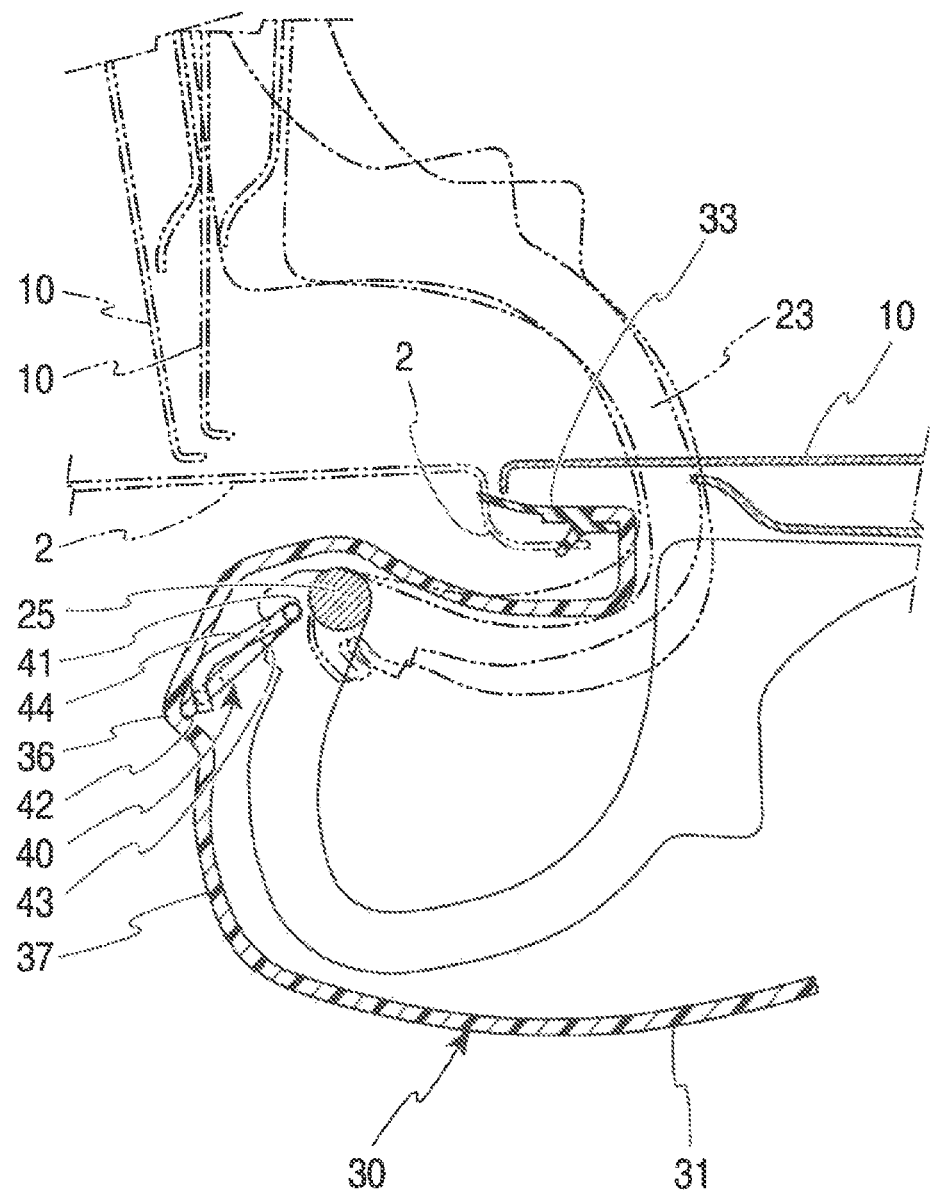
FIG. 7 is an enlarged sectional view of the mounting arm member and a mounting section of the box with the lid open, showing an embodiment of the present invention.

The mounting arm member 20 includes, as shown in FIGS. 6 and 7, a plate-like box mounting arm 23 of the mounting arm member 20 curved in an arcuate shape, a lid mounting part 21 of the mounting arm member 20 that is formed at one distal end of the box mounting arm 23 and that is a portion to be attached to the lid 10, and a box mounting arm engagement part 24 of the mounting arm member 20 that is formed at the other distal end of the box mounting arm 23 and that is a portion to be attached to a box 30.

The lid mounting part 21 of the mounting arm member 20 is fitted into the arm member mounting hole 14 so that the lid 10 is attached to the mounting arm member 20.

The lid 10 and mounting arm member 20 may be formed integrally to omit the lid mounting part 21 of the mounting arm member 20 and the arm member mounting hole 14, namely, the lid mounting part 21 of the mounting arm member 20 may be integrally formed on the backside 12 of the lid 10. In this case, as the lid 10 has the lid mounting part 21 of the mounting arm member 20 integrally formed on its backside 12, the connecting structure of the lid 10 and the mounting arm member 20 becomes simpler, and, with a fewer number of components, can be made more lightweight.

At the distal end of the lid mounting part 21 of the mounting arm member 20, a lid lock 22 of the mounting arm member 20 is formed such as to protrude toward the box 30 of the fuel filler hole. The lid lock 22 engages with a lock pin 32 of the box 30 to be described later when the lid 10 is closed. The lid lock 22 can also be formed to the lid 10.

Figure 17:
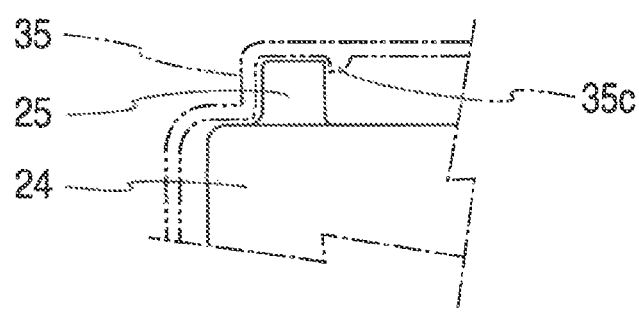
FIG. 17 is an enlarged sectional view of a box engaging pin of the mounting arm member, showing an embodiment of the present invention.
Figure 18:
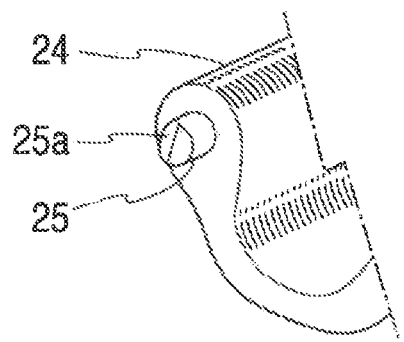
FIG. 18 is an enlarged perspective view of another shape of the box engaging pin of the mounting arm member, showing an embodiment of the present invention.
Figure 19:
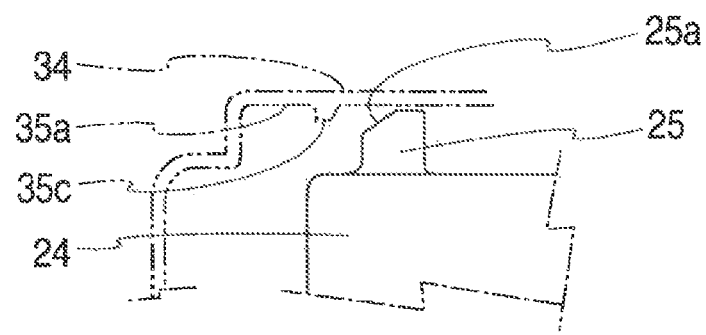
FIG. 19 is an enlarged sectional view of another shape of the box engaging pin of the mounting arm member, showing an embodiment of the present invention.

The box mounting arm engagement part 24 of the mounting arm member 20 has a box engaging pin 25 of the mounting arm member 20 that engages with an arm engaging part 35 of the box 30 to be described later as shown in FIGS. 17 to 19, and is mounted rotatably, by the box engaging pin 25. The box engaging pin 25 is formed on both side faces at the distal end of the box mounting arm engagement part 24.

The box engaging pin 25 of the mounting arm member 20 can have a box engaging pin slope 25a of the mounting arm member 20 by being cut off such as to be slanted toward the distal end. With the box engaging pin slope 25a, the box engaging pin 25 of the mounting arm member 20 can be easily attached to the arm engaging part 35 of the box 30 to be described later.

The box engaging pin 25 can be formed on both sides of the box mounting arm engagement part 24 of the mounting arm member 20 to each protrude, or, instead, can be formed as one continuous pin extending from one side face to the other side face at the distal end of the box mounting arm engagement part 24.

The box engaging pin 25 can have a circular, elliptic, or oval sectional shape. In this case, the box engaging pin 25 can readily be inserted to between a box engaging pin holding protrusion 35b and another box engaging pin holding protrusion 35b to be described later, so that assembling of the mounting arm member 20 becomes easier.

Next, the box 30 to which the lid 10 is attached by the mounting arm member 20 will be described with reference to FIGS. 6 to 16, 24A, and 24B.

In the present embodiment, the main body of the box 30, a box body 31, is formed in a substantially quadrilateral box-like shape, but it can be formed in a circular, elliptic, or similar shape in conformity to the shape of the car body 2 to which the fuel filler hole 1 is formed, and to the shape of the lid 10.

The box body 31 has a fuel filler opening of the box 30 in the center at the bottom in communication with the fuel filler hole 1 of the car body 2 as shown in FIG. 6 to receive a fuel gun (not shown) inserted therein. The box 30 is mounted to a box holding part 3 provided to the car body 2 as shown in FIGS. 6 and 7.

A section in the box 30 where the box mounting arm engagement part 24 of the mounting arm member 20 is mounted extends further inward of the car body 2 (leftward in FIG. 6) than the point where the box holding part 3 is formed in the car body 2, and is configured as an arm housing part 37 of the box 30. The arm housing part 37 will be described in detail later.

As shown in FIG. 6, a lock pin 32 of the box 30 is formed on the opposite side from the arm housing part 37 of the box 30. When the lid 10 is closed, the lock pin 32 engages with the lid lock 22 of the mounting arm member 20 so that the lid 10 can be locked. To open the lid 10, the lock pin 32 is retracted to separate from the lid lock 22.

Figure 8:
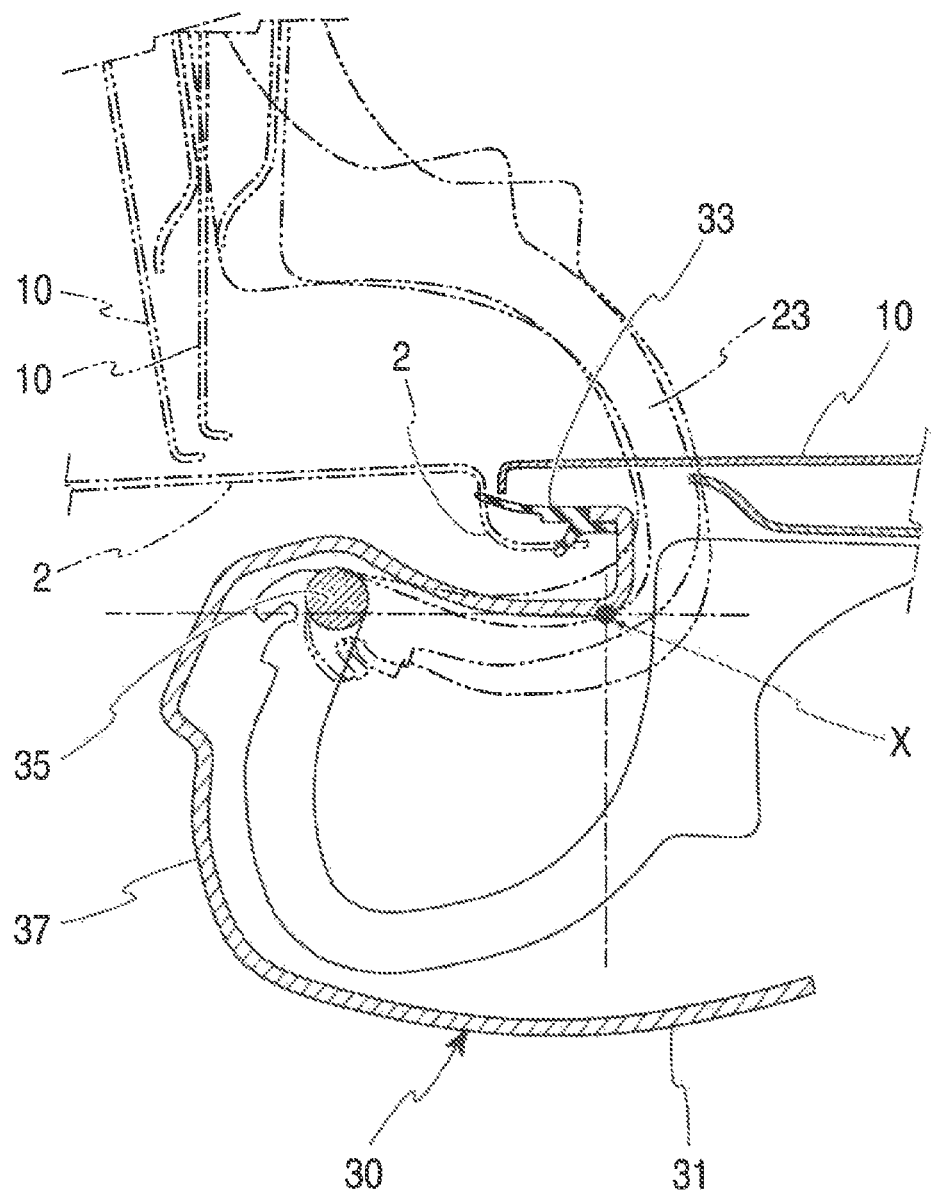
FIG. 8 is an enlarged sectional view of the mounting arm member and the mounting section of the box with the lid open, showing an embodiment of the present invention.
Figure 9:
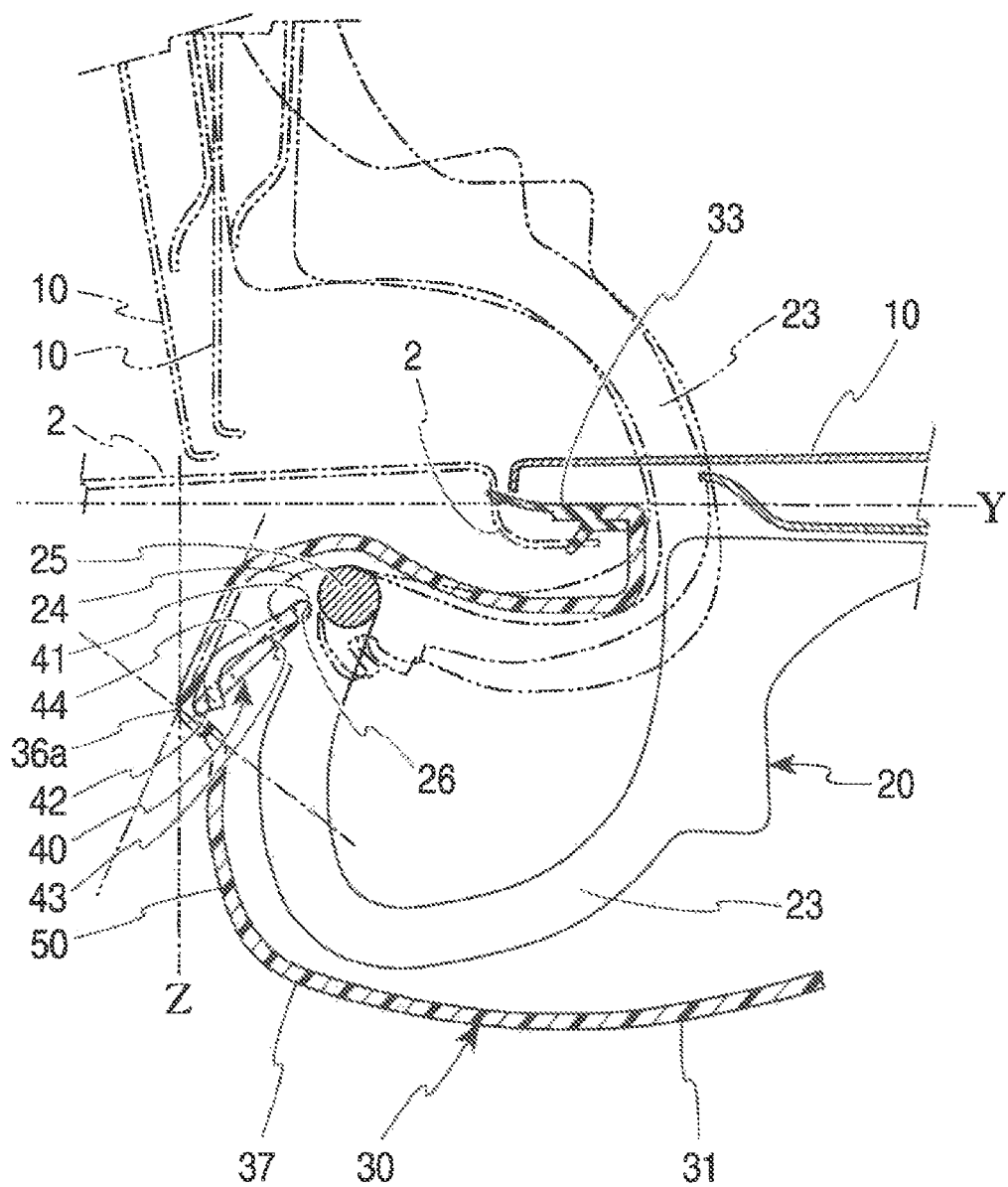
FIG. 9 is an enlarged sectional view of the mounting arm member and the mounting section of the box with the lid open, showing an embodiment of the present invention.

A sealing member 33 of the box 30 is attached around the upper end of the box body 31 of the box 30 as shown in FIGS. 7 to 9 so that a seal can be provided between the box holding part 3 and the upper end of the box body 31 when the box body 31 is mounted to the box holding part 3 of the car body 2. The inclined part along the longitudinal direction of the arm housing part has an angle α ranging from 5° to 45° relative to a vertical line (e.g., Z in FIG. 9) drawn from an extension line (e.g., Y in FIG. 9) connecting upper ends on an arm housing part side and on a counter-arm housing part side of the box body 31 outside the car to the connecting point 36a between the inclined part 38 and the step part 39.

Figure 24A:
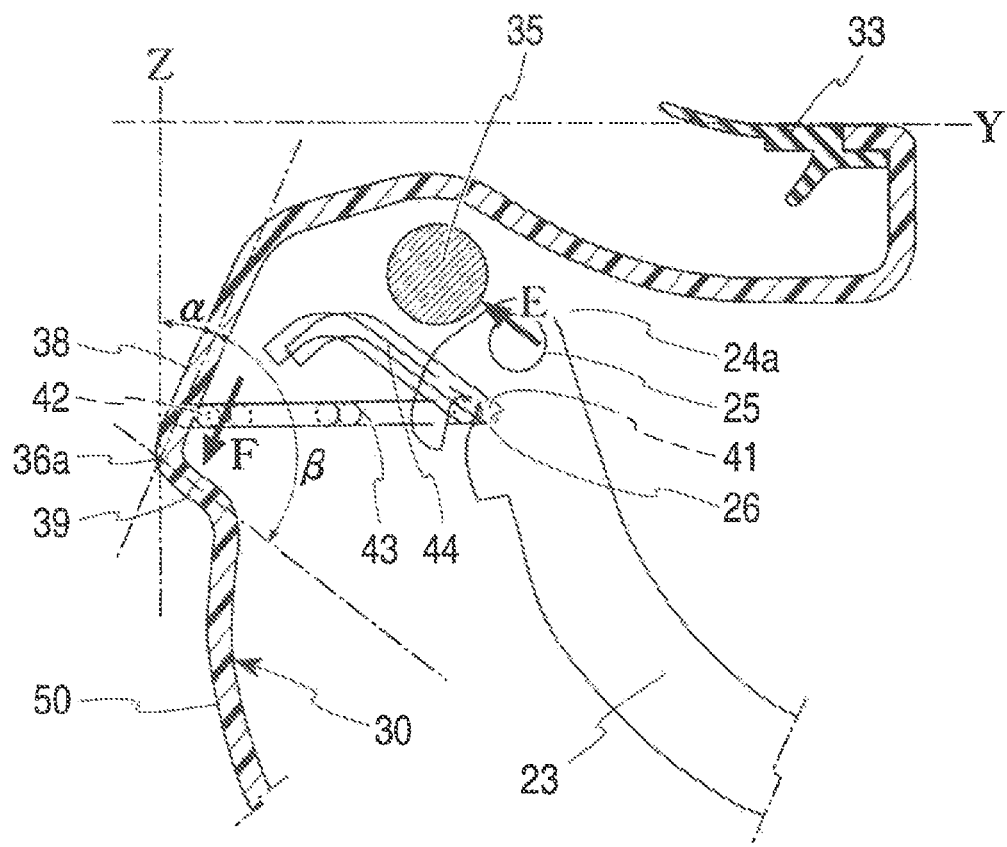
FIGS. 24A and 24B each show an embodiment of the present invention, FIG. 24A being a side view of when an open/close spring box-mounted part abuts on an inclined part of an arm housing part, and FIG. 24B being a side view of when a box engaging pin of the mounting arm member is fixed to an arm engaging part of an arm guide of the box.
Figure 24B:
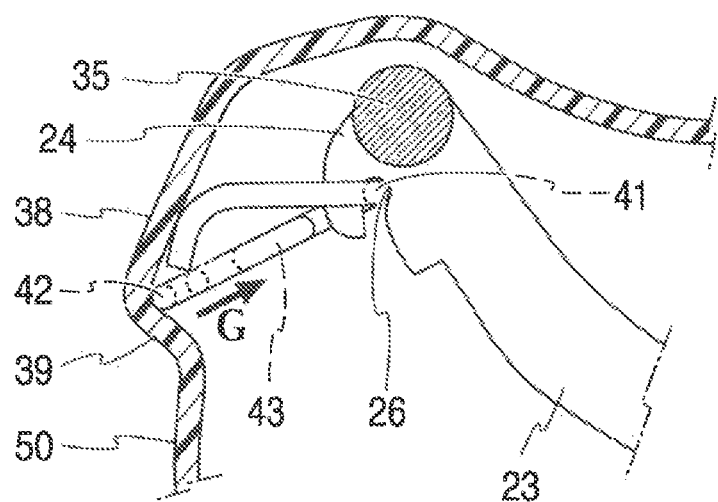

As shown in FIGS. 24A and 24B, the arm housing part 37 of the box 30 includes, along the longitudinal direction thereof, an inclined part 38 for allowing expansion of the space in the arm housing part 37 toward the inside the car, a step part 39 connecting to the inclined part 38, and a bottom part 50 that connects the step part 39 and the box body 31. The inclined part 38 along the longitudinal direction of the arm housing part 37 has an angle α of 20° relative to a vertical line (line Z in FIG. 9) drawn from an extension line (line Y in FIG. 9) connecting upper ends of the box body 31 on the arm housing part side and on the counter-arm housing part side outside the car to a connecting point 36a between the inclined part 38 and the step part 39. The inclined part 38 and the step part 39 make an angle β of 100°.

Figure 13:
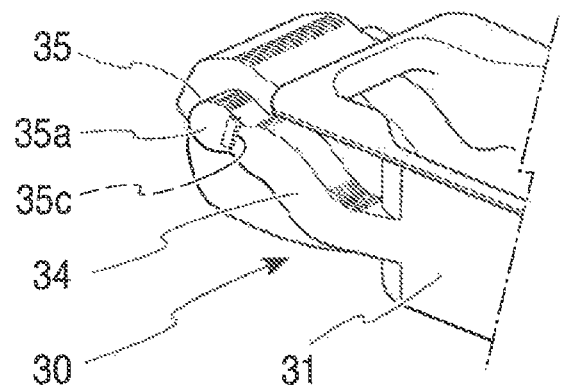
FIG. 13 is a perspective view of an arm guide section of the box, showing an embodiment of the present invention.

The arm housing part 37 of the box 30 includes an engaging pin mounting part 35 of the box 30 to which the box engaging pin 25 that locks the box mounting arm engagement part 24 of the mounting arm member 20 is attached. As shown in FIGS. 12 to 15, an arm guide 34 of the box 30 is formed, which guides the box engaging pin 25 of the mounting arm member 20 from the box body 31 to the arm engaging part 35. The arm guide 34 may be formed as a groove as shown in FIG. 13, or as a notch instead of a groove, or as a protruded part.

When attaching the mounting arm member 20 to the box 30, even though the inner end of the arm housing part 37 of the box 30 is hard to see, since the arm guide 34 is provided, the mounting arm member 20 can be easily assembled to the box 30, by inserting the box engaging pin 25 of the mounting arm member 20 and sliding it inside the arm guide 34. As shown in FIG. 13, the arm engaging part 35 of the box 30 can be provided with an arm engaging pin abutment portion 35a of the box 30, whereby the distal end of the box engaging pin 25 of the mounting arm member 20 can abut on.

Figure 14:
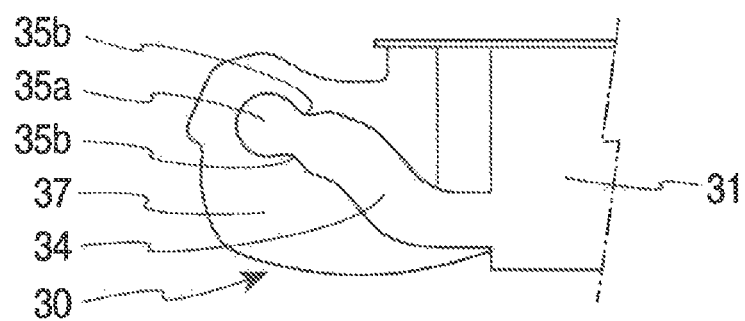
FIG. 14 is a sectional view of the arm guide section of the box, showing an embodiment of the present invention.
Figure 15:
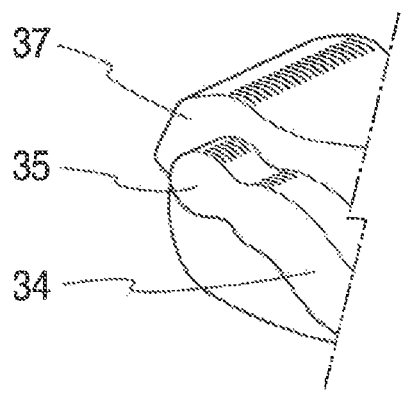
FIG. 15 is an enlarged perspective view of an arm engaging part of the box, showing an embodiment of the present invention.
Figure 16:
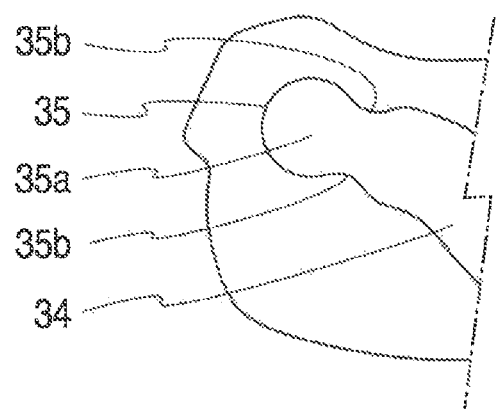
FIG. 16 is an enlarged sectional view of the arm engaging part of the box, showing an embodiment of the present invention.

As shown in FIGS. 14 and 16, in the coupling point between the arm guide 34 and the arm engaging part 35 of the box 30, there are provided two box engaging pin holding protrusions 35b opposite each other. With these box engaging pin holding protrusions 35b that can be flexed, the box engaging pin 25 of the mounting arm member 20, once fitted in the arm engaging part 35 of the box 30, can be prevented from coming off of the arm engaging part 35.

The distance between the box engaging pin holding protrusions 35b should preferably be 90 to 99% of the diameter of the box engaging pin 25 of the mounting arm member 20. This way, when attaching the box engaging pin 25 to the arm engaging part 35, the box engaging pin holding protrusions 35b are flexed to allow the box engaging pin 25 to be fitted in, so that the box engaging pin 25 can be readily attached to, but not easily separated from, the arm engaging part 35.

When the distance between the box engaging pin holding protrusions 35b exceeds 99% of the diameter or axial length of the box engaging pin 25 of the mounting arm member 20, the box engaging pin 25 can readily pass through between the box engaging pin holding protrusions 35b when attaching the mounting arm member 20 to the arm engaging part 35 of the box 30, so that the box engaging pin 25 can readily come off. On the other hand, a distance less than 90% of the diameter or axial length of the box engaging pin 25 is too narrow and make the attachment of the box engaging pin 25 hard.

Furthermore, as shown in FIGS. 13 and 17, in the coupling point between the arm guide 34 and the arm engaging part 35 of the box 30 where the box engaging pin holding protrusions 35b are formed, there may be provided a box engaging pin holding protrusion 35c protruding from the outer face inward (in the direction orthogonal to the box engaging pin holding protrusions 35b).

The box engaging pin holding protrusion 35c can be formed instead of the box engaging pin holding protrusions 35b, or in addition to the box engaging pin holding protrusions 35b. Similarly to the box engaging pin holding protrusions 35b, the box engaging pin holding protrusions 35c can prevent the box engaging pins 25 of the mounting arm member 20 from coming off of the arm engaging parts 35 of the box 30.

The lid 10 may sometimes be opened widely, causing the box mounting arm 23 of the mounting arm member 20 to abut on an upper end portion (indicated with X in FIG. 8) of the box 30, as shown in FIG. 8. In this case, the box mounting arm 23 is urged to rotate around the abutment point X so as to rotate the box engaging pin 25 of the mounting arm member 20 at the distal end of the box mounting arm 23.

The portion of the arm guide 34 of the box 30 close to the arm engaging part 35, namely, near the box engaging pin holding protrusions 35b, is formed along a direction that is different from the direction in which the box engaging pin 25 of the mounting arm member 20 is biased.

Therefore, when the lid 10 is opened widely, causing the box mounting arm 23 of the mounting arm member 20 to abut on the box body 31, and the box mounting arm 23 is urged to rotate around the abutment point, causing the box engaging pin 25 to rotate toward the box engaging pin holding protrusions 35b, the box engaging pin 25 hardly comes off of the arm engaging part 35, since the arm guide 34 is formed along the direction different from the biasing direction.

The box engaging pin holding protrusions 35b should preferably have a substantially triangular sectional shape, with the slope on the side facing the arm guide 34 of the box 30 being gentler than the slope on the side facing the box engaging pin 25 of the mounting arm member 20. This way, when the box engaging pin 25 is inserted from the arm guide 34 of the box 30 to between the box engaging pin holding protrusions 35b, it can readily be inserted to between the box engaging pin holding protrusions 35b because the slopes are gentle, while the box engaging pin 25 can hardly come off of the arm engaging part 35 of the box 30 because of the large angle of the slope.

Figure 20:
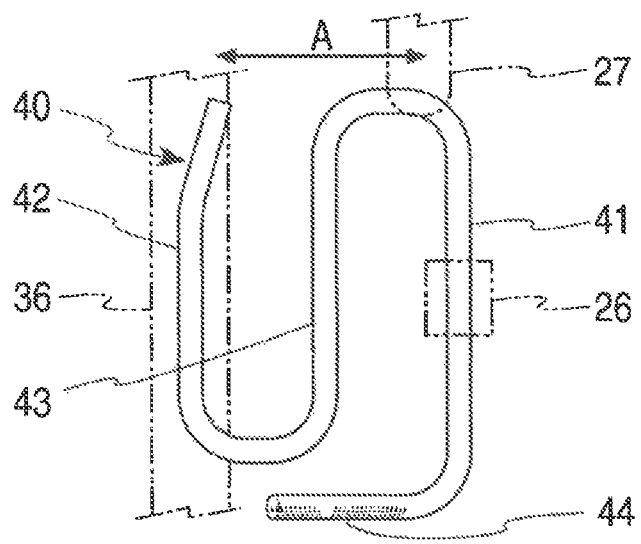
FIG. 20 is a plan view of the open/close spring, showing an embodiment of the present invention.

Next, the open/close spring 40 attached to the box 30 and the mounting arm member 20 will be described with reference to FIGS. 20 to 22. The open/close spring 40 is bent to have a substantially Z shape or square zigzag shape as a whole as shown in FIG. 20.

The open/close spring 40 is attached to the box 30 such as to bias the mounting arm member 20. The open/close spring 40 includes, as shown in FIG. 20, an open/close spring box-mounted part 42 held by a spring mounting portion 36 of the box 30, an open/close spring arm-mounted part 41 held by the box mounting arm engagement part 24 of the mounting arm member 20, and an open/close spring body 43 connecting the open/close spring arm-mounted part 41 and the open/close spring box-mounted part 42.

An open/close spring box-abutment part 44 extends from the distal end of the open/close spring arm-mounted part 41 to abut on the arm housing part 37 of the box 30.

Figure 21:
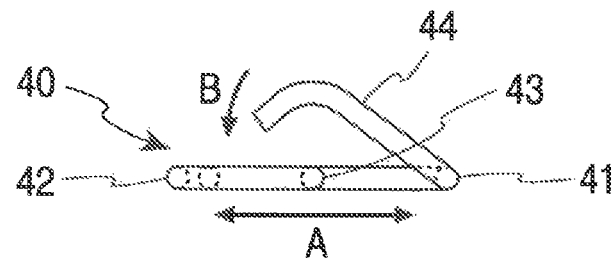
FIG. 21 is a side view of the open/close spring, showing an embodiment of the present invention.

The open/close spring box-abutment part 44 extends from the distal end of the open/close spring arm-mounted part 41 diagonally downward of a plane formed of the open/close spring arm-mounted part 41 and the open/close spring body 43 as shown in FIG. 21 (diagonally downward to the left in FIG. 21).

The open/close spring 40 is formed of a single wire, which is a metal wire member, as shown in FIG. 20. Therefore, the structure is simple and it can be easily produced by bending a metal wire member such as a single wire. The spring does not require other members due to the simple structure, so that the weight can be reduced.

The open/close spring 40 is bent to have a substantially square zigzag shape as a whole in the present embodiment. The open/close spring arm-mounted part 41 that corresponds to an upper side laterally extends straight as shown in FIG. 20.

Similarly, the open/close spring box-mounted part 42 that corresponds to a lower side laterally extends straight as shown in FIG. 20.

The open/close spring body 43 connecting the open/close spring arm-mounted part 41 and the open/close spring box-mounted part 42 laterally extends straight. One distal end closer to the open/close spring arm-mounted part 41 is curved in a U shape and connected to the distal end of the open/close spring arm-mounted part 41, while the other distal end closer to the open/close spring box-mounted part 42 is curved in a U shape and connected to the distal end of the open/close spring box-mounted part 42.

The distal ends of the open/close spring arm-mounted part 41 and the open/close spring box-mounted part 42 can be connected diagonally so that the spring has a Z shape as a whole.

Figure 22:
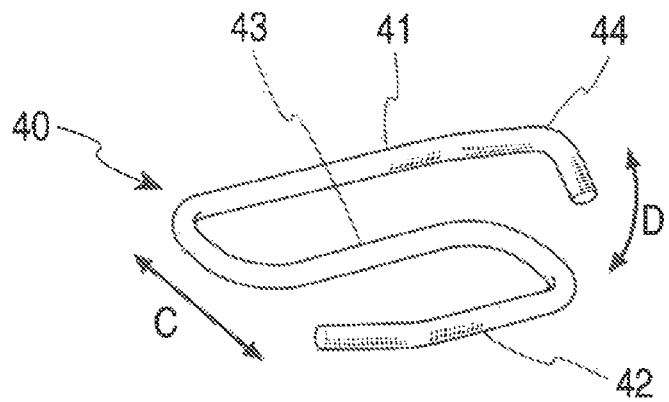
FIG. 22 is a perspective view of directions in which the open/close spring extends and contracts, and flexes, showing an embodiment of the present invention.

As shown in FIG. 20, when the open/close spring arm-mounted part 41 and the open/close spring box-mounted part 42 are pressed closer to each other or pulled apart (in the direction of arrow A shown in FIG. 20), an urging force is created that acts in the direction indicated by arrow C in FIG. 22.

As described in the foregoing, since the open/close spring box-abutment part 44 extends diagonally downward of a plane formed by the open/close spring arm-mounted part 41 and the open/close spring body 43, the open/close spring box-abutment part 44 flexes such as to rotate around the connecting point to the open/close spring arm-mounted part 41 relative to the open/close spring arm-mounted part 41 and the open/close spring body 43 as shown in FIG. 21. Thus, an urging force is created that acts in the direction indicated by arrow D in FIG. 22.

A spring pressing projection 27 is formed for pressing a portion near the connecting point between the distal end of the open/close spring arm-mounted part 41 opposite from the distal end where the open/close spring box-abutment part 44 extends and the open/close spring body 43. The spring pressing projection 27 is formed either to the mounting arm member 20 or to the box 30. When the open/close spring box-abutment part 44 abuts the arm housing part 37 of the box 30 and urges the mounting arm member 20, the spring pressing projection 27 can prevent the open/close spring 40 from rotating by reaction force.

Next, how the open/close spring 40 works when the open/close spring 40 is attached to the mounting arm member 20 and the box 30 will be described with reference to FIGS. 6, 7, 10, 11, and 20 to 23.

Figure 10:
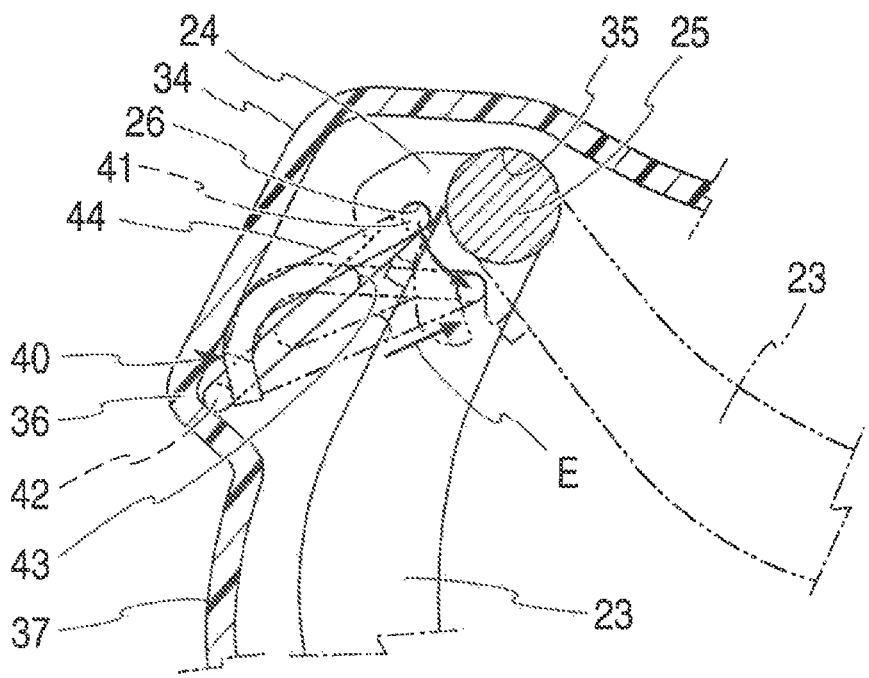
FIG. 10 is an enlarged sectional view, showing an embodiment of the present invention, of a section where an open/close spring is mounted, and illustrates a state when the lid is opened or closed.
Figure 11:
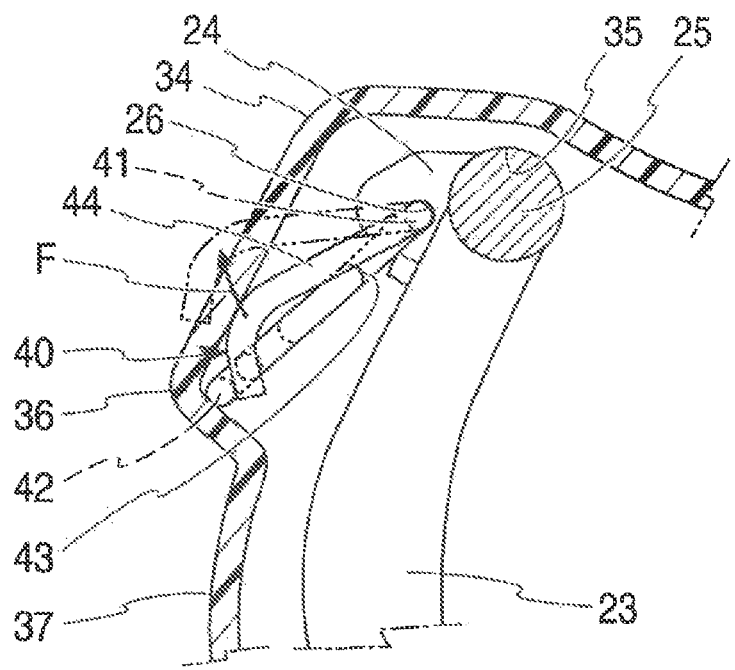
FIG. 11 is an enlarged sectional view, showing an embodiment of the present invention, of the section where the open/close spring is mounted, and illustrates a state when the fuel lid is popped up.
Figure 12:
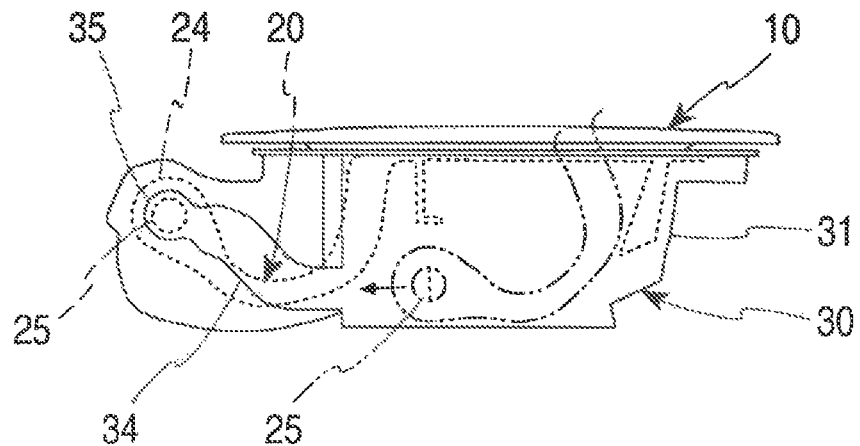
FIG. 12 is a side view of the box, showing an embodiment of the present invention.

The open/close spring 40 is set such that, as shown in FIGS. 10 and 11, the open/close spring arm-mounted part 41 is attached to a spring mounting portion 26 of the mounting arm member 20, while the open/close spring box-mounted part 42 is attached to the spring mounting portion 36 of the box 30.

Figure 23:
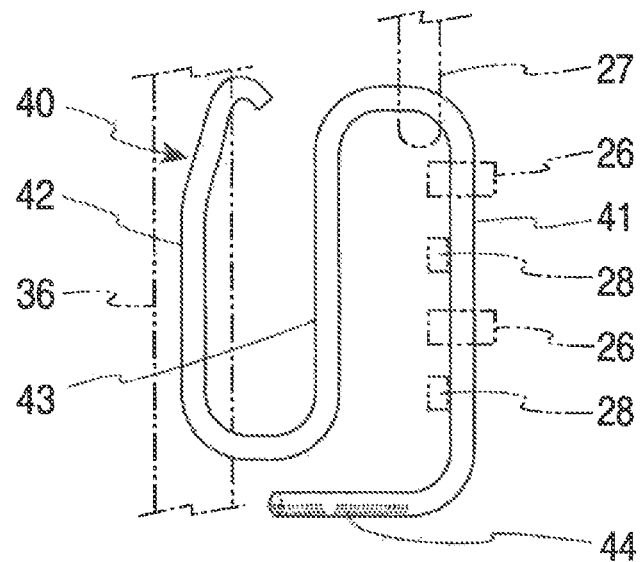
FIG. 23 is a plan view of the open/close spring, showing an embodiment of the present invention, of another way of retaining the open/close spring to the mounting arm member.

Optionally, as shown in FIG. 23, the mounting arm member 20 may include two spring mounting portions 26 of the mounting arm member 20 for holding the open/close spring arm-mounted part 41 of the open/close spring 40, and two spring pressing protruded portions 28 of the mounting arm member 20 on both sides of one of the spring mounting portions 26. If this is the case, the mounting arm member 20 may have one spring mounting portion 26 and two spring pressing protruded portions 28, each on both sides of the spring mounting portion 26, or, two spring mounting portions 26 and three spring pressing protruded portions 28, each on both sides of each spring mounting portion 26.

This way, the open/close spring arm-mounted part 41 can be sandwiched from both sides alternately by the spring mounting portions 26 of the mounting arm member 20 and spring pressing protruded portions 28. The spring mounting portions 26 of the mounting arm member 20 and spring pressing protruded portions 28 hold the open/close spring arm-mounted part 41 from the right side in FIG. 23 and from the left side in FIG. 23, respectively.

Therefore, the open/close spring arm-mounted part 41 of the open/close spring 40 can be prevented from being loose in the left and right direction in FIG. 23, namely, toward the open/close spring body 43 and the opposite direction, by the spring mounting portions 26 of the mounting arm member 20 and the spring pressing protruded portions 28, so that the open/close spring 40 is stably held on the mounting arm member 20.

Moreover, the spring mounting portions 26 of the mounting arm member 20 can be formed such as to cover the open/close spring arm-mounted part 41. In this case, the upper face of the open/close spring arm-mounted part 41 is covered by the spring mounting portions 26 while the lower face makes tight contact with the box mounting arm engagement part 24 of the mounting arm member 20. Since the open/close spring arm-mounted part 41 is sandwiched by the spring mounting portions 26 and spring pressing protruded portions 28 in the left and right direction, it is securely and stably held on the mounting arm member 20 in both lateral and up and down directions.

In this case, however, when attaching the open/close spring arm-mounted part 41 of the open/close spring 40 to the mounting arm member 20, the open/close spring arm-mounted part 41 cannot be fitted from above (from above the sheet plane downward of FIG. 23) since the spring mounting portions 26 of the mounting arm member 20 are formed such as to cover the open/close spring arm-mounted part 41. Also, because of the open/close spring box-abutment part 44 at the distal end, the open/close spring arm-mounted part 41 cannot be laterally inserted into between the spring mounting portions 26 and spring pressing protruded portions 28 (from the upper side to the lower side in FIG. 23).

Thus, the open/close spring box-abutment part 44 of the open/close spring 40 is bent down first (on the left side in FIG. 23 so that it is parallel to the sheet plane), and the open/close spring arm-mounted part 41 is inserted from the upper side in FIG. 23 as far as to between the upper spring mounting portion 26 and the upper spring pressing protruded portion 28 of the mounting arm member 20.

Next, the open/close spring box-abutment part 44 is rotated (above the sheet plane of FIG. 23), moved past beside the upper spring pressing protruded portion 28, and inserted to between the upper spring pressing protruded portion 28 and the lower spring mounting portion 26.

Further, the open/close spring box-abutment part 44 of the open/close spring 40 is bent down (on the left side in FIG. 23 so that it is parallel to the sheet plane), and the open/close spring arm-mounted part 41 is inserted to between the lower spring mounting portion 26 and the lower spring pressing protruded portion 28 of the mounting arm member 20.

Next, the open/close spring box-abutment part 44 is rotated (above the sheet plane of FIG. 23), moved past beside the lower spring pressing protruded portion 28, and inserted until the open/close spring box-abutment part 44 moves past the lower spring pressing protruded portion 28.

After that, the open/close spring box-abutment part 44 of the open/close spring 40 is bent down (on the left side in FIG. 23 so that it is parallel to the sheet plane), whereupon the attachment of the open/close spring arm-mounted part 41 is finished.

When the lid 10 is closed, the open/close spring body 43 is flexed such that the open/close spring arm-mounted part 41 and the open/close spring box-mounted part 42 are closer together, namely, are pressed in the direction of arrow E shown in FIG. 10. The open/close spring box-abutment part 44 is abutted on the arm housing part 37 close to the spring mounting portion 36 of the box 30 and pressed in the direction of arrow F shown in FIG. 11.

With the open/close spring 40 attached to the mounting arm member 20 and the box 30 and with the lid 10 closed, the lock pin 32 of the box 30 locks the lid lock 22 of the mounting arm member 20 as indicated by broken lines in FIG. 6.

To open the lid 10 for filling up or the like, the lock pin 32 is released. This allows the open/close spring box-abutment part 44 to apply a biasing force to slightly rotate the mounting arm member 20 as shown in FIG. 11.

Thus, as shown in FIG. 6, the distal end of the lid 10 can slightly lift up from the surface of the car body 2. After that, the elevated distal end of the lid 10 is lifted up by hand so that the lid 10 is fully open. The spring pressing projection 27 prevents rotation of the open/close spring 40 at this time so that the distal end of the lid 10 can be reliably lifted up.

When the lid 10 is fully opened, the box mounting arm 23 of the mounting arm member 20 rotates to a position indicated by two-dot chain lines in FIG. 10. The open/close spring 40 that has been attached with its open/close spring arm-mounted part 41 and open/close spring box-mounted part 42 compressed is now opened to prevent rotation of the box mounting arm 23, so that the lid 10 is prevented from closing by its own weight during the fuel filling. The lid 10 is closable by hand against the biasing force of the open/close spring 40.

The open/close spring box-abutment part 44 of the open/close spring 40 is bent from the open/close spring arm-mounted part 41 such that the biasing force resulting from extension and contraction between the open/close spring arm-mounted part 41 and the open/close spring box-mounted part 42, and the biasing force resulting from the flexure of the open/close spring box-abutment part 44 are generated in different parts of the open/close spring 40 in this manner.

Therefore, even when there are changes in the shapes of the mounting arm member 20 and the box 30, the angle and size of the open/close spring box-abutment part 44, and the sizes of the open/close spring arm-mounted part 41, open/close spring body 43, and open/close spring box-mounted part 42 can be adjusted separately in accordance with the changes in the shapes of the mounting arm member 20 and the box 30, so that the open/close spring 40 can be mounted easily.

Next, the method of mounting the lid 10 will be described with reference to FIGS. 24A and 24B.

First, the box 30, with the arm housing part 37 facing downward, is set substantially vertically (corresponding to line Y in FIG. 24A) to a box 30 mounting jig (not shown).

Next, the open/close spring arm-mounted part 41 of the open/close spring 40 is attached to the spring mounting portions 26 of the mounting arm member 20.

The box engaging pins 25 of the mounting arm member 20 with the open/close spring 40 attached thereto are inserted into the arm guides 34 of the arm housing part 37 of the box 30, and then moved toward the arm engaging parts 35 at the distal ends of the arm guides 34. At this time, the open/close spring box-mounted part 42 of the open/close spring 40 is suspended substantially parallel to line Y.

During the process in which the box engaging pins 25 of the mounting arm member 20 of the lid 10, to which the open/close spring 40 has been attached, move toward the arm engaging parts 35 at the distal ends of the arm guides 34, the open/close spring box-mounted part 42 of the open/close spring 40 abuts on the inclined part 38 of the arm housing part 37, as shown in FIG. 24A.

Since the inclined part 38 has an angle α of 20°, a force toward the step part 39 (in the direction of arrow F in FIG. 24A) acts on the open/close spring box-mounted part 42 when the box engaging pins 25 of the mounting arm member 20 of the lid 10, to which the open/close spring 40 has been attached, move toward the arm engaging parts 35 at the distal ends of the arm guides 34 (in the direction of arrow E in FIG. 24A). Therefore, the open/close spring box-mounted part 42 of the open/close spring 40 moves along the inclined part 38 toward the connecting point 36a between the inclined part 38 and the step part 39, and eventually reaches the connecting point 36a between the inclined part 38 and the step part 39.

At this time, the box engaging pins 25 of the mounting arm member 20 of the lid 10 have not yet reached the arm engaging parts 35 at the distal ends of the arm guides 34.

Since the angle between the inclined part 38 and the step part 39 is 100°, during the process in which the box engaging pins 25 of the mounting arm member 20 of the lid 10 move toward the arm engaging parts 35 at the distal ends of the arm guides 34, the open/close spring 40 does not ride over the step part 39 and stays at the connecting point 36a.

In the process in which the box engaging pins 25 of the mounting arm member 20 of the lid 10 further move toward the arm engaging parts 35 at the distal ends of the arm guides 34, the open/close spring 40 is flexed such that the open/close spring arm-mounted part 41 and open/close spring box-mounted part 42 are compressed (in the direction of arrow G in FIG. 24B), until the box engaging pins 25 of the mounting arm member 20 are fixed at the arm engaging parts 35 of the arm guides 34 of the box 30.

Lastly, the box engaging pins 25 on the mounting arm member 20 of the lid 10 move past the box engaging pin holding protrusions 35c of the arm guides 34, reach the arm engaging parts 35 of the arm guides 34 of the box 30, and are fixed there, and then the attachment of the lid 10 is complete (FIG. 24B).

The invention claimed is:

1. A lid mounting structure for opening and closing a lid that closes a fuel filler hole or a charging socket of a car body, the lid mounting structure comprising:
   a mounting arm member attached to the lid;
   a box attached to the fuel filler hole or the charging socket, the box to which the mounting arm member is attached;
   the mounting arm member including a lid mounting part to which the lid is attached, and a box mounting arm rotatably attached to the box, the box mounting arm including a box mounting arm engagement part at a distal end thereof that rotatably engages the mounting arm member with the box, and
   the box including an arm housing part extending from a box body, the arm housing part including an engaging pin mounting part to which a box engaging pin that engages with the box mounting arm engagement part of the mounting arm member is attached; and
   an open/close spring attached to the box and the mounting arm member biasing the mounting arm member, the open/close spring including:
   an open/close spring box-mounted part held by the arm housing part of the box;
   an open/close spring arm-mounted part held by the box mounting arm engagement part of the mounting aim member;
   an open/close spring body connecting the open/close spring arm-mounted part and the open/close spring box-mounted part; and
   an open/close spring box-abutment part extending from a distal end of the open close spring arm-mounted part to abut on the arm housing part.

2. The lid mounting structure according to claim 1, wherein the open/close spring box-abutment part of the open/close spring biases the mounting arm member such as to slightly open the lid in opening the lid.

3. The lid mounting structure according to claim 1, wherein the open/close spring is formed of a single metal wire member,
   wherein the open/close spring box-abutment part is formed by bending the metal wire member from the open/close spring arm-mounted part, and wherein a distal end portion of the open/close spring box-abutment part abuts on the arm housing part when the lid is closed.

4. The lid mounting structure according to claim 1, wherein the open/close spring box-abutment part applies a biasing force diagonally relative to a direction in which the open/close spring arm-mounted part biases the box mounting arm engagement part of the mounting arm member.

5. The lid mounting structure according to claim 1, wherein the open/close spring is formed by bending such as to have a substantially Z shape or a square zigzag shape as a whole.

6. The lid mounting structure according to claim 1, further comprising a spring pressing projection that presses a portion near a connecting point between the open/close spring body and a distal end of the open/close spring arm-mounted part opposite from the distal end where the open/close spring box-abutment part extends, and that is provided on either one of the open/close spring arm-mounted part and the box.

7. The lid mounting structure according to claim 1, wherein the mounting arm member further includes:
   a spring mounting portion holding the open/close spring arm-mounted part of the open/close spring; and
   a plurality of spring pressing protruded portions provided on both sides of the spring mourning portion,
   wherein the open/close spring arm-mounted part is sandwiched alternately by the spring mounting portion and the spring pressing protruded portions of the mounting arm member.

8. The lid mounting structure according to claim 7, wherein the spring mounting portion of the mounting arm member sandwiches the open/close spring arm-mounted part such as to cover the open/close spring arm-mounted part.

9. A lid mounting structure for opening and closing a lid that closes a fuel filler hole or a charging socket of a car body, the lid mounting structure comprising:
   a mounting arm member attached to the lid; and
   a box attached to the fuel filler hole or the charging socket, the box to which the mounting arm member is attached,
   the mounting arm member including a lid mounting part to which the lid is attached, and a box mounting arm rotatably attached to the box, the box mounting arm including a box engaging pin that is provided at a distal end thereof and rotatably engages the mounting arm member with the box; and
   the box including an arm housing part extending from a box body, the arm housing part including an arm engaging part that engages with the box engaging pin, and the box including an arm guide that guides the box engaging pin from the box body to the arm engaging part of the box.

10. The lid mounting structure according to claim 9, further comprising a box engaging pin holding protrusion at a coupling point between the arm guide and the arm engaging part.

11. The lid mounting structure according to claim 9, wherein, when the lid is opened and the box mounting arm of the mounting arm member abuts on the box body of the box, the box engaging pin is biased in a rotating direction by rotation of the box mounting arm around an abutment point, and
   wherein the arm guide includes a groove near the box engaging pin holding protrusion oriented along a direction that is different from the rotating direction in which the box engaging pin is biased.

12. The lid mounting structure according to claim 9, further comprising two box engaging pin holding protrusions formed opposite each other on the arm guide,
   wherein the two box engaging pin holding protrusions are spaced apart from each other by a distance that is 90% to 99% of a diameter of the box engaging pin, or by a distance that is 90% to 99% of an axial length of the box engaging pin.

13. The lid mounting structure according to claim 9, wherein the box engaging pin includes an inclined surface cut toward a distal end thereof.

14. The lid mounting structure according to claim 9, wherein the box engaging pin has a circular, elliptic, or oval sectional shape.

15. The lid mounting structure according to claim 9, further comprising a box engaging pin holding protrusion having a substantially triangular sectional shape, with a slope on one side facing the arm guide being gentler than a slope on another side facing the arm engaging part.

16. The lid mounting structure according to claim 9, wherein the lid mounting part of the mounting arm member is integrally formed on a backside of the lid.

17. A method of mounting a lid,
   wherein a mounting arm member is attached to the lid that closes a fuel filler hole or a charging socket of a car body,
   wherein a box including a recess and attached to the fuel filler hole or the charging socket includes a box body including an opening and an arm housing part extending from the box body,
   wherein the mounting arm member includes:
     a lid mounting part to which the lid is attached;
     a box mounting arm rotatably attached to the arm housing part of the box;
     a box engaging pin that is provided at a distal end of the box mounting arm; and
     an open/close spring mounting portion to which an open/close spring that biases the mounting arm member is attached,
   wherein the arm housing part of the box includes, along a longitudinal direction thereof:
     an inclined part that allows expansion of a space in the arm housing part toward inside a car;
     a step part connecting to the inclined part; and
     a bottom part that connects the step part and the box body,
   wherein the arm housing part of the box includes, along a width direction thereof, an arm guide that guides the box engaging pin of the mounting arm member, and an arm engaging part at a distal end of the arm guide to which the box engaging pin is attached, and
   wherein the open/close spring includes an open/close spring arm-mounted part attached to the open/close spring mounting portion, an open/close spring box-mounted part that abuts on the arm housing part of the box, and an open/close spring body present between the open/close spring arm-mounted part and the open/close spring box-mounted part,
   the method comprising:
     fixedly setting the box substantially vertically to a jig, with the arm housing part facing downward;
     attaching the open/close spring arm-mounted part of the opertIclose spring to the open/close spring mounting portion of the mounting arm member;

inserting the box engaging pin of the mounting arm member, to which the open/close spring has been attached, into the arm guide of the arm housing part of the box;

moving the box engaging pin toward the arm engaging part at the distal end of the arm guide; and fixing the box engaging pin of the mounting arm member to the arm engaging part of the aim guide of the box, wherein the moving of the box engaging pin of the mounting aim member, to which the open/close spring has been attached, toward the arm engaging part at the distal end of the arm guide comprises:

abutting the open/close spring box-mounted part of the open/close spring on the inclined part of the arm housing part of the box;

moving the open/close spring box-mounted part along the inclined part toward the step part;

abutting the open/close spring box-mounted part on a connecting point between the inclined part and the step part of the arm housing part and stays there; and flexing the open/close spring such that the open/close spring arm-mounted part and the open/close spring box-mounted part are compressed until the box engaging pin of the mounting arm member is fixed to the arm engaging part of the arm guide of the box.

18. The method according to claim 17, wherein the inclined part along the longitudinal direction of the arm housing part has an angle α ranging from 5° to 45° relative to a vertical line drawn from an extension line connecting upper ends on an arm housing part side and on a counter-arm housing part side of the box body outside the car to the connecting point between the inclined part and the step part.

19. The method according to claim 18, wherein the inclined part and the step part make an angle β that satisfies 90°≤α+β≤130°.

20. The method according to claim 17, wherein a box engaging pin holding protrusion is formed at a coupling point between the arm guide and the arm engaging part, and wherein the box engaging pin of the mounting arm member moves past the box engaging pin holding protrusion before being fixed to the arm engaging part of the arm guide.

\* \* \* \* \*